United States Patent
Bates et al.

(10) Patent No.: US 12,087,102 B1
(45) Date of Patent: Sep. 10, 2024

(54) EVENT DETECTION AND LOCALIZATION USING AUDIO

(71) Applicant: Zoox, Inc., Foster City, CA (US)

(72) Inventors: Mark Alan Bates, Kenilworth (GB); Venkata Subrahrnanyarn Chandra Sekhar Chebiyyam, San Francisco, CA (US); Nam Gook Cho, Cupertino, CA (US); Subhasis Das, Menlo Park, CA (US); Shaminda Subasingha, San Ramon, CA (US); Xuan Zhong, San Jose, CA (US)

(73) Assignee: Zoox, Inc., Foster City, CA (US)

( * ) Notice: Subject to any disclaimer, the term of this patent is extended or adjusted under 35 U.S.C. 154(b) by 331 days.

(21) Appl. No.: 17/554,570

(22) Filed: Dec. 17, 2021

(51) Int. Cl.
| | |
|---|---|
| *G07C 5/00* | (2006.01) |
| *B60W 60/00* | (2020.01) |
| *G01H 17/00* | (2006.01) |
| *G05B 13/02* | (2006.01) |
| *G07C 5/08* | (2006.01) |
| *G08G 1/16* | (2006.01) |

(52) U.S. Cl.
CPC ......... *G07C 5/008* (2013.01); *B60W 60/0053* (2020.02); *G01H 17/00* (2013.01); *G05B 13/027* (2013.01); *G07C 5/0808* (2013.01); *G07C 5/085* (2013.01); *G08G 1/16* (2013.01)

(58) Field of Classification Search
CPC ...... G07C 5/008; G07C 5/0808; G07C 5/085; B60W 60/0053; G01H 17/00; G05B 13/027; G08G 1/16
See application file for complete search history.

(56) References Cited

U.S. PATENT DOCUMENTS

| | | | |
|---|---|---|---|
| 11,789,457 B1 * | 10/2023 | Woo | H04R 3/005 |
| | | | 700/253 |
| 2020/0342696 A1 * | 10/2020 | Larsen | G07C 5/0816 |
| 2021/0407219 A1 * | 12/2021 | Tammali | G08G 1/205 |
| 2022/0126875 A1 * | 4/2022 | Hammoud | B60W 30/09 |
| 2023/0141589 A1 * | 5/2023 | Stenneth | H04L 67/12 |
| | | | 709/217 |
| 2023/0290195 A1 * | 9/2023 | Batie | H04L 9/0643 |
| 2023/0331222 A1 * | 10/2023 | Lind | B60W 30/0953 |

* cited by examiner

*Primary Examiner* — James J Lee
*Assistant Examiner* — Steven Vu Nguyen
(74) *Attorney, Agent, or Firm* — Lee & Hayes, P.C.

(57) ABSTRACT

Systems and techniques for detecting and locating low impact collisions, such as relatively low energy impact collisions involving an autonomous vehicle, are disclosed herein. Sensor data from audio sensors configured on a vehicle may be used to determine whether a threshold number of such sensors have detected sounds associated with a collision. Scores determined for the sensors based on audio energy and confidence values can be used to determine a location estimate for the detected collision.

20 Claims, 6 Drawing Sheets

EVENT DETECTION AND LOCALIZATION USING AUDIO

BACKGROUND

In the event of a collision, safety systems on passenger transport vehicles may be designed to mitigate the effects of the crash, e.g., by inflating an airbag or tightening a physical restraint. In many such safety systems, accelerometers and/or other sensors are placed at the front of a vehicle to detect a sudden and large change in acceleration or other movement of the vehicle, such as caused by striking an object head-on, and the sensed condition is used to deploy the safety system, e.g., by inflating an airbag. Conventional safety systems are often not optimized for detecting low impact (e.g., low energy) collisions, where it is not necessary to deploy conventional safety apparatus to ensure the safety of passengers of the vehicle. However, low impact collisions may occur frequently during vehicle operation and may still result in damage and other repercussions. Accurately and efficiently detecting low impact collisions may, at times, present challenges.

BRIEF DESCRIPTION OF THE DRAWINGS

The detailed description is described with reference to the accompanying figures. In the figures, the left-most digit of a reference number identifies the figure in which the reference number first appears. The same reference numbers in different figures indicate similar or identical items.

DETAILED DESCRIPTION

Figure 1:
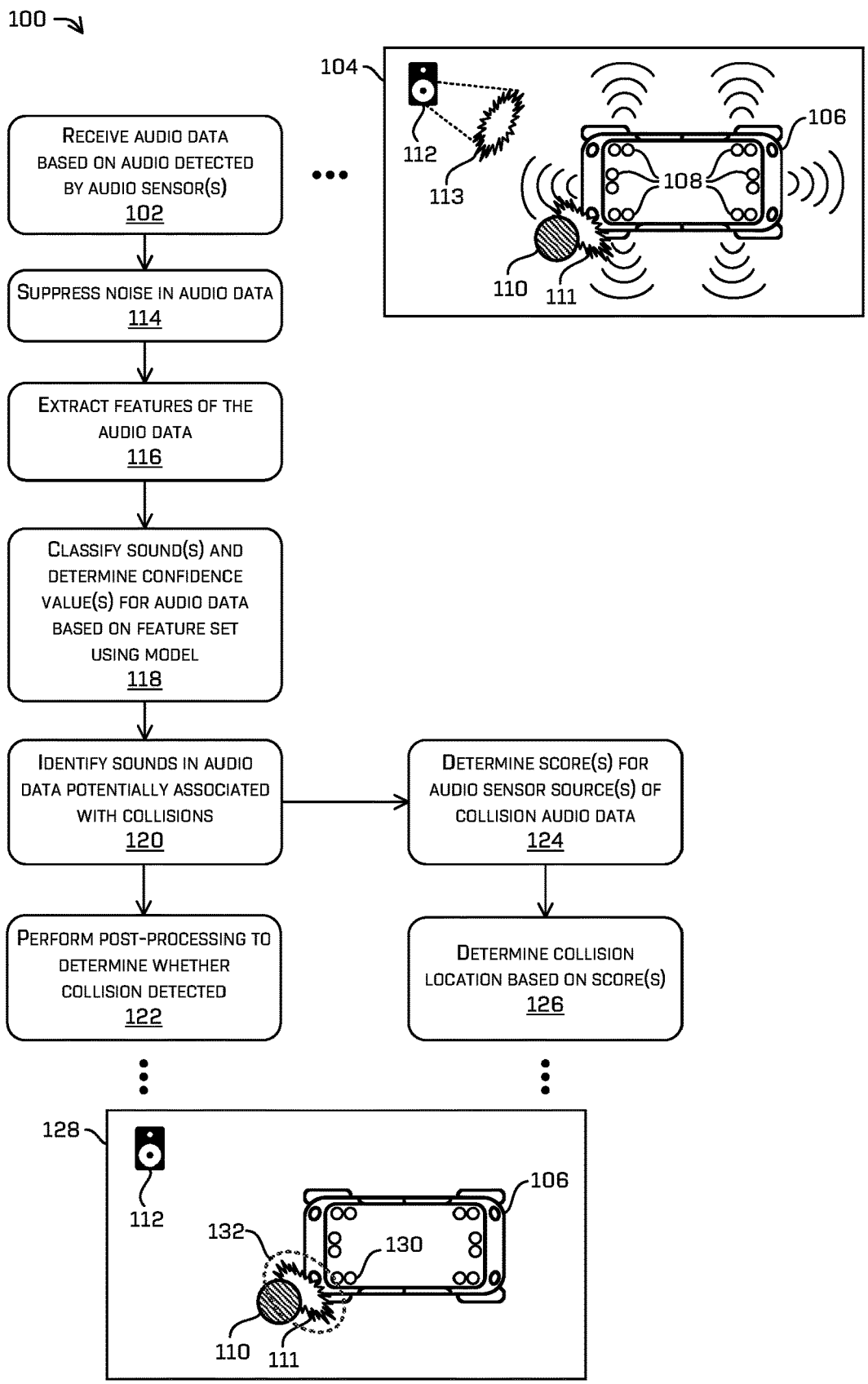
FIG. 1 illustrates an example process to determine a low impact collision and a low impact collision location based on an event, in accordance with examples of the disclosure.

Systems and techniques for detecting a low impact collision may include receiving audio data from one or more audio sensors configured at a vehicle and processing the audio data to determine whether a low impact collision is represented in the audio data. This processing may include identifying and/or extracting features in the audio data and classifying sounds represented by the audio data to determine whether the sounds represent a low impact collision. Data associated with a low impact collision may then be determined based on the audio data when such collisions are determined. Techniques for determining the location of such a collision based on audio data received from one or more audio sensors are also disclosed herein. In conventional systems and techniques, collisions associated with a minimum threshold of energy may be detected based on data received from one or more sensors (e.g., mechanical sensors, visual sensors, inertial sensors, accelerometers, strain gauges, etc.). In such systems and techniques, the impact of the collision may be analyzed to determine whether to deploy or use one or more impact mitigation systems, such as airbags or passenger restraints. However, conventional systems and techniques may not accurately detect lower impact collisions having less than the minimum threshold of energy, and that therefore do not require the use or deployment of such mitigations systems. This may result in a failure to detect, record, and/or report these low impact collisions, even though actions responsive to such collisions may still be required.

In examples, one or more audio sensors configured at a vehicle (e.g., an autonomous vehicle) may detect acoustic signals in an environment and generate audio data, for example as a stream of audio data. In various examples, individual audio sensors may generate their own individual streams or sets of audio data. The audio data received from one or more audio sensors may be processed by various components to determine whether a low impact collision is represented in the audio data. For instance, the audio data received from audio sensors may be processed by a noise suppression component to remove or suppress background noise from the audio data to facilitate that detection of impact sounds in the foreground audio data. A feature extraction component may then extract one or more features or feature sets from the foreground audio. A convolutional neural network (CNN) executing a machine-learned model may then classify the one or more sounds represented in the audio data (e.g., based on the extracted features or feature sets) and assign one or more confidence values to the classified sounds. A collision detection component may then use the classified sounds and confidence values to determine whether an impact is associated with the audio data. Further processing may be performed, for example, on individual sets or streams of processed audio data associated with individual audio sensors, to determine whether a low impact collision was detected. When a low impact collision, or other type of collision, is determined, data associated with such a collision may then be determined, such as collision onset and offset times.

In examples, the audio data from one or more audio sensors may also, or instead, be used to determine a location of a collision (e.g., a low impact collision). Because the sounds generated by a low impact or low energy collision may be insufficient to perform localization using conventional audio localization techniques, a collision location score for the sensors and/or channels associated with a collision detection may be used to determine a low impact collision location as described herein. The audio data from one or more audio sensors may be processed as described herein by one or more of a noise suppression component and a feature extraction component to facilitate the determination of classifications and confidence values for one or more sounds represented in the audio data by a CNN. In an example, the CNN may also, or instead, determine an energy associated with such sounds and/or one or more confidence values associated with such sounds and/or the sensors from which the audio data representing such sounds originated. Using these energy and/or confidence values, an impact localization component may process the audio data associated with one or more audio sensors to determine a location of an impact represented in such audio data as described in more detail below.

The systems and techniques described herein may be directed to leveraging audio sensor data and neural networks to enable a vehicle, such as an autonomous vehicle, to more accurately detect and locate low impact and/or low energy collisions and therefore respond appropriately to such collisions, facilitating safer navigation through an environment. For example, collisions may be defined by the number and types of advanced driver-assistance system that are employed, for example, using the Society of Automotive Engineers (SAE) Advanced Driver-Assistance Systems (ADAS) scale. In Level 1 or greater collisions, the force of the collision may be relatively significant and various automatic safety features may be deployed (e.g., airbags, restraints, automatic emergency braking, etc.). In Level 0 collisions, however, the force of the collision may be less than that of a Level 1 or greater collision, and therefore similar automatic safety features may not be deployed. These lower level collisions may be more difficult to detect because they may not involve the significant physical forces that are easily detected by mechanical sensors (e.g., inertial sensors, accelerometers, strain gauges, etc.). However, there may be useful operations that could be performed by a vehicle and/or its associated systems in response to such low impact collisions (e.g., a Level 0 collision). Moreover, the data detected, determined, and/or generated by the low impact collision detection systems and techniques described herein may be of value in other, higher impact collisions. Therefore, in various examples, the disclosed systems and techniques may be implemented to detect and determine data for any type and/or magnitude of collision.

The systems and techniques described herein can utilize machine-learned models to determine more accurate classifications of sounds and/or other information represented in audio data originating at vehicle sensors. The systems and techniques described herein can then utilize the classifications and associated confidence values determined using the machine-learned models to facilitate the accurate detection of a collision and determination of a collision location on a vehicle. By using the systems and techniques described herein to detect and locate low impact collisions, the examples described herein may result in increased certainty of collision detections and collision locations, allowing an autonomous vehicle to take appropriate and accurate responsive actions and facilitating safer travel by the autonomous vehicle in an environment.

For example, techniques described herein may be faster and/or more robust than conventional techniques, as they may increase the ability of an autonomous vehicle to detect and locate low impact collision with objects in an environment, reducing the likelihood of failing to identify or mis-identifying a collision. That is, techniques described herein provide a technological improvement over existing collision detection, classification, tracking, and/or responsive navigation technology. In addition to improving the accuracy with which low impact collisions are detected and/or located, the systems and techniques described herein can improve safety outcomes by, for example, more promptly and appropriately responding to low impact collisions.

The systems and techniques described herein can be implemented in a number of ways. Example implementations are provided below with reference to the following figures. Although discussed in the context of an autonomous vehicle, the techniques described herein can be applied to a variety of systems (e.g., a sensor system or a robotic platform) and are not limited to autonomous vehicles. For example, the techniques described herein can be applied to semi-autonomous and/or manually operated vehicle. In another example, the techniques can be utilized in an aviation or nautical context, or in any system involving objects or entities having dimensions and/or other physical parameters that may not be known to the system. Further, although discussed in the context of originating with particular types of sensor data and processing with particular types of components, data and data structures as described herein can include any two-dimensional, three-dimensional, or multi-dimensional data and data associated with any other types of sensors (e.g., cameras, lidar, radar, sonar, time-of-flight, and the like). Additionally, the techniques described herein can be used with real data (e.g., captured using sensor(s)), simulated data (e.g., generated by a simulator, training data, and the like) or any combination of the two.

Figure 4:
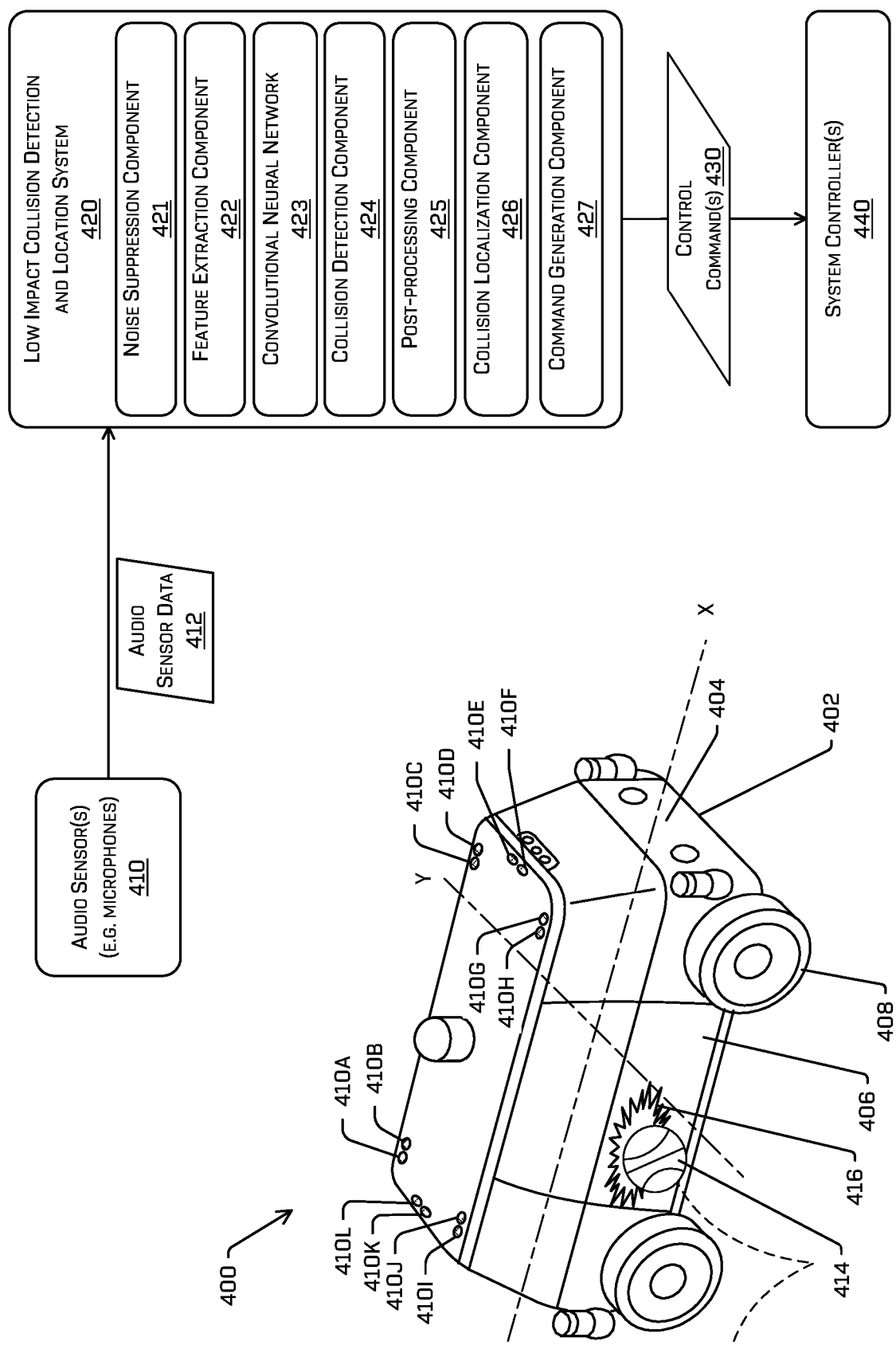
FIG. 4 illustrates an example environment in which the systems and techniques set forth herein may be implemented, in accordance with examples of the disclosure.
Figure 7:
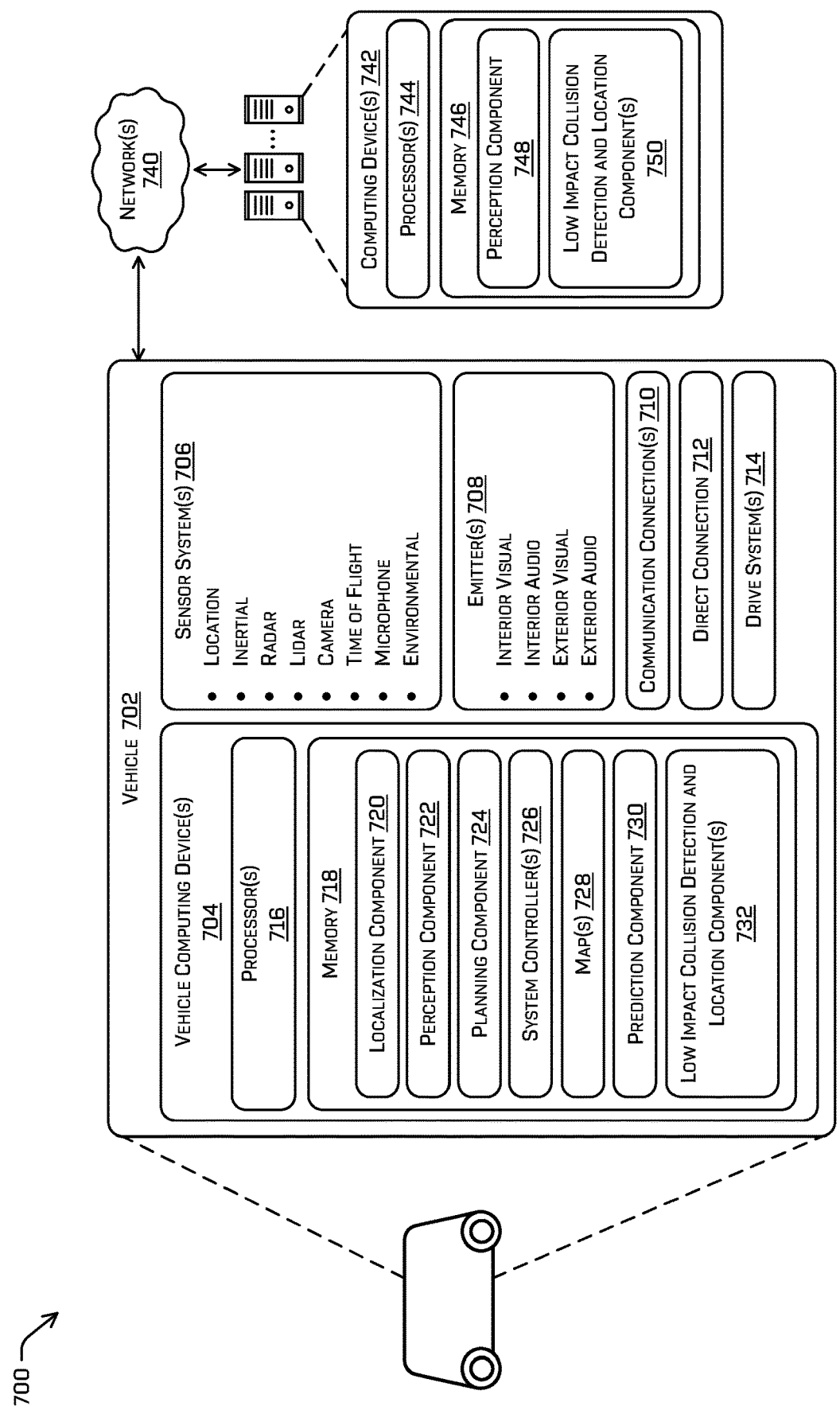
FIG. 7 depicts a block diagram of an example system for implementing the techniques described herein.

FIG. 1 is a pictorial flow diagram of an example process 100 for detecting and locating a low impact collision. In examples, one or more operations of the process 100 may be implemented by a vehicle computing system, such as by using one or more of the components and systems illustrated in FIGS. 4 and 7 and described below. For example, one or more components and systems can include those associated with a low impact collision detection and location system 420 illustrated in FIG. 4 and/or one or more low impact collision detection and location components 732 illustrated in FIG. 7. In examples, the one or more operations of the process 100 may be performed by a remote system in communication with a vehicle, such as one or more low impact collision detection and location components 750 illustrated in FIG. 7. In still other examples, the one or more operations of the process 100 may be performed by a combination of a remote system and a vehicle computing systems. However, the process 100 is not limited to being performed by such components and systems, and the components and systems of FIGS. 4 and 7 are not limited to performing the process 100.

At operation 102, a vehicle computing system may receive sensor data from one or more sensors configured at a vehicle. For example, the vehicle computing system may receive audio data from one or more audio sensors configured at the vehicle. In examples, the audio data may be received as a stream of audio data. The vehicle computing system may receive an individual stream of audio data from an individual audio sensor, where the vehicle may be configured with one or more audio sensors (e.g., the vehicle computing system may receive multiple streams of audio data, where each stream is received from one of multiple sensors). The data received at the operation 102 may be raw audio data and/or may be processed audio data, such as multichannel data where each channel represents data originating at an individual sensor. The audio data may represent one or more sounds and/or noise detected in an environment in which the vehicle may be operating.

An example 104 accompanying the operation 102 illustrates a top-down view of an environment that includes a vehicle 106 that may be configured with sensors 108 to detect objects and sounds in the environment. The sensors 108 configured at the vehicle 106 may be audio sensors (e.g., microphones) and may be multiple sensors configured about the vehicle 106 (e.g., at the front, rear, and sides proximate to the wheels). For example, the sensors 108 may be multiple microphones disposed at spatially separated locations of the vehicle 106. The microphones 108 may be configured about the vehicle 106 such that they are capable of detecting sound around the entire perimeter of the vehicle 106 (e.g., 360-degree detection about the vehicle in the horizontal plane). One or more of the microphones 108 may be configured at any location on a body of the vehicle 106

(e.g., roof, right side, left side, front, rear, etc.). The sensors 108 may be configured to detect sounds such as a collision sound 111 resulting from an object 110 colliding with the vehicle 106 and a background sound 113 that may be emitted by an object 112, e.g., spaced from the vehicle 106.

At operation 114, the vehicle computing system may begin processing the data received at the operation 102 by suppressing the noise in the data, for example, to increase the signal-to-noise ratio (SNR) and/or the signal-to-distortion ratio (SDR) of the data. For example, the vehicle computing system may use one or more techniques at operation 114 to reduce, suppress, and/or eliminate the background noise represented in audio data received at operation 102 to facilitate the processing of foreground sound represented in the audio data. In examples, the vehicle computing system may perform one or more operations to remove or reduce transient audio signals, signals of minimal duration (e.g., signals persisting less than a threshold amount of time), and/or background noise of any type.

At operation 116, the vehicle computing system may determine or otherwise extract from the audio data one or more features of the audio data and/or the sound(s) represented by the audio data. In examples, the features may include one or more audio energy values and/or one or more confidence scores as described herein (e.g., channel confidence score, sensor confidence score, etc.). For example, at the operation 116, the vehicle computing system may determine a reliable feature set associated with the audio data for use by a neural network (e.g., a CNN) in classifying the sounds represented in the audio data.

At operation 118, the vehicle computing system may classify the sounds in the audio data, for example using a neural network executing a machine-learned model. In examples, such a neural network may classify the sounds represented in the audio data as a collision, a non-collision (e.g., noise), a type of collision, and/or one or more other classifications. In further examples, the vehicle computing system (e.g., the neural network) may also, or instead, determine one or more confidence values for the sound(s) and/or the audio data. For example, the vehicle computing system may determine a confidence value for the individual sounds represented in the audio data. Alternatively or in addition, the vehicle computing system may determine a confidence value for the audio data itself and/or the channel associated with the audio data. In examples, a channel associated with particular audio data may be associated with a particular individual sensor (e.g., audio sensor). A confidence value may be a probability score that ranges from zero (no confidence) to one (100% confidence).

Using the classifications and/or confidence values determined at the operation 118, at operation 120 the vehicle computing system may determine which, if any, of the classified sounds may be associated with a collision.

At operation 122, the vehicle computing system may determine, based on the available processed audio data, whether a collision event occurred. For example, multiple streams or sets of audio data from various multiple sensors configured at a vehicle may be received and processed as described herein in regard to the previous operations of the process 100. The resulting collision determinations (e.g., as determined at the operation 120 for individual streams or sets of data) may be analyzed to determine whether a threshold number of the sets or streams of audio data are associated with a positive collision determination. If so, at operation 122, the vehicle computing system may determine that a collision was detected (e.g. a collision event has occurred). The vehicle computing system may also (e.g., if it determines that a collision has been detected), or instead, determine at operation 122 an onset time and/or an offset time of the collision. If not, at operation 122, the vehicle computing system may determine that no collision has been detected (e.g. no collision event has occurred or a non-collision event has occurred). The post-processing operations that may be performed at the operation 122 are described in more detail herein (e.g., in the description of process 500 illustrated in FIG. 5).

In examples, the vehicle computing system may also, or instead, utilize confidence values in the collision determination. For example, the vehicle computing system may include in a count of positive collision determinations those determinations that are associated with channels (e.g., audio data sensor channels) having a confidence value greater than a threshold value while not including in the count of positive collision determinations those determinations that are associated with channels having a confidence value less than the threshold value. Other combinations of positive collision determinations, confidence values, and other criteria are contemplated. Further details regarding collision determinations are provided herein.

The vehicle computing system may also, or instead, determine a location of a collision on a vehicle (e.g., where the body of the vehicle was impacted by the collision). In examples, one or more operations for determining a potential collision location may be performed in response to determining that a collision has occurred (e.g., at operation 122 of the process 100). Alternatively, one or more operations for determining a potential collision location may be performed regardless of the collision determination (e.g., made at operation 122 of the process 100).

At operation 124, the vehicle computing system may use the data determined at the operation 120 based on the audio data for individual audio sensors to determine a score for the audio data that can be used to determine a collision location. In examples, the vehicle computing system may determine, at the operation 120, one or more energy values for the audio data (e.g., audio energy associated with a particular channel and/or audio sensor). This energy value may be determined by a neural network using a machine-learned model or it may be passed through as part of the audio data received from the audio sensor. In examples, this energy value may be a feature extracted from the audio data, for example, at operation 116.

The vehicle computing system may use this energy in combination a confidence value to determine a score for a particular set or stream of audio data and/or its associated channel or sensor. For example, a score s for a particular set or stream of audio data may be represented as $s = \alpha * \text{energy} - (1-\alpha) * \text{confidence}$, where $\alpha$ is a scaler value between 0 and 1.

At operation 126, the vehicle computing system may determine one or more collision locations on the vehicle based on the scores associated with the audio data (e.g., individual scores for individual sets of audio data). For example, where the vehicle computing system has processed multiple sets of audio data originating at multiple sensors, the vehicle computing system may use the scores determined for the individual sets of audio data to determine the location of a collision represented in at least a subset of the sets of audio data. In examples, the vehicle computing system may determine that the collision impacted the vehicle body at an area of the body proximate to the sensor associated with the audio data having the highest score (e.g., as determined at the operation 124). Alternatively, the vehicle computing system may use an algorithm or other process that may use more than one score to determine a collision location. For instance, where there are two scores higher than any other scores, the vehicle computing system may use an algorithm to estimate a collision location between the sensors associated with those scores. The vehicle computing system may also, or instead, determine and/or provide one or more collision locations at operation 126 along with corresponding confidence values (e.g., confidence values associated with the sensor, channel, data stream, etc. that may be associated with the score used to determine the respective collision locations).

An example 128 illustrates a top-down view of the environment that includes the vehicle 106. As shown in this example, the vehicle 106's computing system may have determined that the background sound 113 was background noise and suppressed it (thus sound 113 is no longer illustrated in the example 128). The vehicle 106's computing system may have also determined that the potential collision sound 111 is a collision sound and may have located the collision at location 132 on the vehicle 106's body based on the score determined for the sensors 130.

Figure 2:
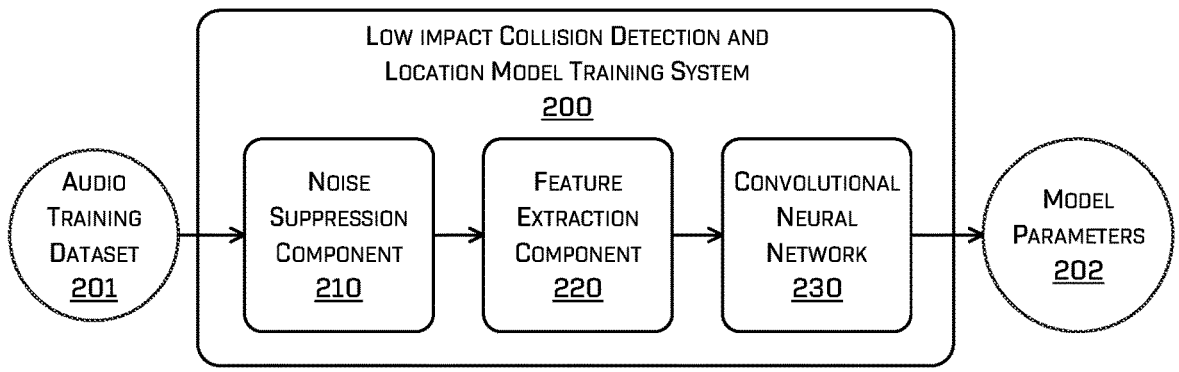
FIG. 2 depicts a block diagram of an example system for training a low impact collision detection and location model, in accordance with examples of the disclosure.

FIG. 2 is a block diagram of an example system 200 for training a low collision detection and location model and generating model parameters. In examples, one or more components of the system 200 may be implemented offline to train a model intended to be configured for execution at a vehicle computing system, such as by using one or more of the components and systems illustrated in FIGS. 4 and 7 and described below. For example, one or more components and systems configured to execute such a model can include those associated with low impact collision detection and location system 420 illustrated in FIG. 4 and/or a one or more low impact collision detection and location components 732 illustrated in FIG. 7. In examples, the one or more components of the system 200 may be implemented by a remote system in communication with a vehicle to which a model may be transmitted, such one or more low impact collision detection and location components 750 illustrated in FIG. 7. In still other examples, the one or more components of the system 200 and/or a system to which a model may be transmitted may be implemented by a combination of a remote system and a vehicle computing systems. However, the system 200 is not limited to being implemented by such components and systems or generating models for such components and systems, and the components and systems of FIGS. 4 and 7 are not limited to implementing and/or interacting with the system 200.

The system 200 may include a noise suppression component 210 that may receive an audio training dataset 201. The audio training dataset 201 may include audio data associated with collisions and other acoustic events. This may be historical collision data representing actual collisions that have occurred in the past and/or simulated collision data. For example, the audio training dataset 201 may include audio data associated with collisions of varying energy and/or impact (e.g., low, medium, and high impact collisions) and/or associated data that may be used by the system 200 to train a low impact collision detection and location model. The audio training dataset 201 may also include data indicating the number, locations, positions, and/or types of microphones that recorded or are otherwise associated with training data. Alternatively, the audio training dataset 201 may include audio data and collision data (e.g., only) without specifying microphone types, locations, etc. to train the model for a more general implementation (e.g., for use with a variety of sensor types in a variety of locations). Such associated data may further include classification data, confidence data, environment data, sensor data, and/or any other data that may be used to train a model. By using data associated with collisions of varying energy and impact, a model may be trained to recognize a low impact collision based on, for example, similarities of low impact collision characteristics to characteristics of higher impact collisions.

In examples, the audio training dataset 201 may include, or may include data based on, audio data in an objects sound database that includes "positive" data associated with sounds that may be of interest, such as audio data associated with the sounds of impacts objects (e.g., as recorded in an anechoic chamber) of various types of objects hitting other (e.g., plastic objects hitting other plastic objects, wood objects hitting other wood objects, objects of different materials colliding, hands clapping, hands hitting other objects, etc.). The audio training dataset 201 may also, or instead, include positive data based on actual impacts in areal-world environment (e.g., impacts recorded by autonomous vehicles operating in a production environment). Such positive data may include data associated with sounds of low impact collisions.

The audio training dataset 201 may also, or instead, include "negative" audio data associated with sounds that are not of interest and therefore should suppressed or filtered. For example, the audio training dataset 201 may include background noise, street noise, and other environmental noise that may have been recorded for training purposes and/or in a production environment. In the training system 200, the audio training dataset may include a mixture of a variety of such positive and negative sounds.

The audio training dataset 201 may include data associated with sounds of impacts of particular types. For example, the sounds represented in the audio training dataset 201 may include sounds of a vehicle colliding with particular types of object at particular sections of the vehicle's body. The sounds represented in the audio training dataset 201 may also, or instead, include sounds recorded by particular types of microphones located at particular sections of the vehicle's body.

The noise suppression component 210 may be configured to suppress noise in the dataset 201, for example, to increase the SNR and/or the SDR of the data in the dataset 201. In examples, the system 200 may use one or more techniques to reduce, suppress, and/or eliminate the background noise represented in dataset 201 to facilitate the processing of foreground sound represented in the dataset 201.

The system 200 may also include a feature extraction component 220 configured to receive the "denoised" dataset 201 from the noise suppression component 210 and determine or otherwise extract one or more features of the audio data and/or the sound(s) represented by the dataset 201. For example, the feature extraction component 220 may determine a reliable feature set associated with the audio data in the dataset 201 for use by a neural network (e.g., a CNN) in classifying the sounds represented in the dataset 201.

The system 200 may further include a convolutional neural network 230 configured to receive the denoised dataset 201 and the feature set determined by the feature extraction component 220 from the component 220. The CNN 230 may be configured to process the feature set and the dataset 201, for example by performing variations of operations using convolutional operations, to determine a set of model parameters 202 for a low impact collision detection and/or localization machine-learned model. For example, the model parameters 202 may define or otherwise be associated with a machine-learned model as described herein to determine confidence values, energy values, classifications, and/or any other data that may be associated with audio data and/or used to determine and/or locate collisions (e.g., all collisions, low impact collisions, etc.).

Figure 3:
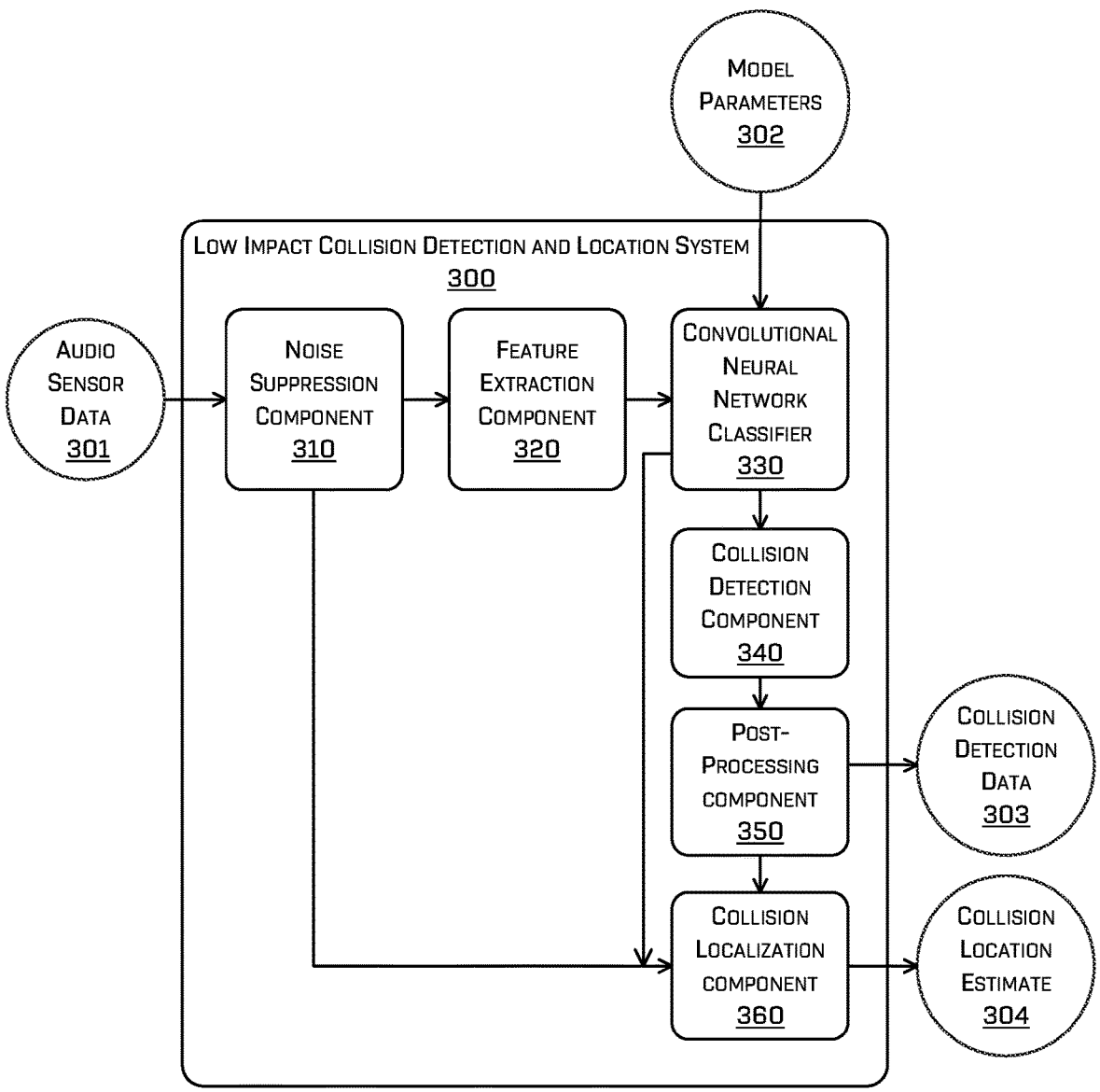
FIG. 3 depicts a block diagram of an example system for detecting a low impact collision and determining a location of the collision, in accordance with examples of the disclosure.

A machine-learned model and/or model parameters (e.g., as determined by system 200 of FIG. 2) may be used in a production and/or inference environment (e.g., configured on an autonomous vehicle and executed in real-time or near real-time) to detect and/or locate low impact collisions. FIG. 3 is a block diagram of an example system 300 for detecting and/or locating low impact collisions that may include such a model. In examples, one or more components of the system 300 may be configured for execution at a vehicle computing system, such as by using one or more of the components and systems illustrated in FIGS. 4 and 7 and described below. For example, one or more components and systems configured to execute such a model can include those associated with low impact collision detection and location system 420 illustrated in FIG. 4 and/or a one or more low impact collision detection and location components 732 illustrated in FIG. 7. In examples, the one or more components of the system 300 may be implemented by a remote system in communication with a vehicle to which a model may be transmitted, such as one or more low impact collision detection and location components 750 illustrated in FIG. 7. In still other examples, the one or more components of the system 300 and/or a system to which a model may be transmitted may be implemented by a combination of a remote system and one or more vehicle computing systems. However, the system 300 is not limited to being implemented by such components and systems or generating models for such components and systems, and the components and systems of FIGS. 4 and 7 are not limited to implementing and/or interacting with the system 300.

The system 300 may include a noise suppression component 310 that may receive audio sensor data 301 from one or more audio sensors configured at a vehicle. In examples, the audio sensor data 301 may be received as a stream of audio data associated with an individual sensor or multiple streams of audio data, individual streams of which are associated with individual audio sensors. The audio sensor data 301 may be raw audio data and/or may be processed audio data, such as multichannel data where each channel represents data originating at an individual sensor. The audio sensor data 310 may include data representing one or more sounds and/or noise detected in an environment in which the vehicle may be operating.

The noise suppression component 310 may process the audio sensor data 301 by suppressing, reducing, and/or eliminating noise (e.g., background noise) in the audio sensor data 301 using one or more techniques (e.g., to increase the SNR and/or the SDR of the audio sensor data 301). The noise suppression component 310 may provide the resulting denoised audio sensor data 301 to a feature extraction component 320.

The feature extraction component 320 may determine or otherwise extract from the denoised audio sensor data 301 a feature set representing acoustic and/or other features represented by the audio sensor data 301. The feature extraction component 320 may provide this feature set and/or the audio sensor data 301 to a convolutional neural network (CNN) classifier 330 configured with a sound classifier model (e.g., a model or model parameters as determined and/or generated by system 200 of FIG. 2).

Using a machine-learned sound classifier model, the CNN classifier 330 may classify one or more sounds in the audio sensor data 301. In examples, the CNN classifier 330 may classify individual sounds represented in the audio sensor data 301 as one or more of a collision, a non-collision, a type of collision, and/or one or more other classifications. The CNN classifier 330 may use data from the feature extraction component 320 (e.g., audio data) to determine such classifications. For example, the CNN classifier 330 may classify a sound as being associated with a Level 0 or low impact collision and/or a higher level or higher impact collision. The CNN classifier 330 may also, or instead, determine one or more confidence values for the audio sensor data 301. For example, the CNN classifier 330 may determine a confidence value for an individual channel or sensor source of the audio sensor data 301. Alternatively, or in addition, the CNN classifier 330 may determine a confidence value for individual classifications of individual sounds represented in the audio sensor data 301. In examples, a confidence value may be a probability score that ranges from zero (no confidence) to one (100% confidence). Each channel and/or classified sound may have one or more associated confidence values determined and assigned to it by the CNN classifier 330.

The CNN classifier 330 determine a classification for the audio sensor data 301 based on classifications for other audio sensor data. For example, where the CNN classifier 330 receives multiple sets of data associated with multiple sensors, the CNN classifier 330 may determine that several of the sets have similar audio data that may be associated with a collision and therefore may classify those sets as being associated with a collision. Alternatively, the CNN classifier 330 may determine that one set out of all receives sets of audio data includes audio data that may be associated with a collision while none of the remaining sets include such data, and may therefore not classify any of the sets of data as being associated with a collision because it is very unlikely that a collision occurred since the sounds audio data indicates a very localized sound (e.g., detected by only one sensor).

The CNN classifier 330 may provide the determined sound classifications, confidence scores, and/or any portion of the audio sensor data 301 to a collision detection component 340. Using these classifications, confidence values, and/or the audio sensor data 301, the collision detection component 340 may determine whether one or more of the classified sounds may be associated with a collision. The collision detection component 340 may provide this collision determination data, the classification data and/or confidence value data associated with the audio sensor data 301, and/or any portion of the audio sensor data 301 to a post-processing component 350.

The post-processing component 350 may generate collision detection data 303 based on the data received from the collision detection component 340. In examples, the post-processing component 350 may generate the collision detection data 303 based on multiple sets or streams of data received from the collision detection component 340, where individuals of such sets or streams may be associated with a particular individual channel and/or originating sensor. The post-processing component 350 may analyze these datasets to determine whether a threshold number of the datasets are associated with a positive collision determination, for example within a particular window of time (e.g., 10 ms, 20 ms, 30 ms, etc.). If at least the threshold number of the datasets indicate that a collision has been detected within the particular window of time, the post-processing component 350 may determine that a collision was detected. If not, the post-processing component 350 may determine that no collision has been detected. This determination may be included by the post-processing component 350 in the collision detection data 303.

In examples, the post-processing component 350 may also, or instead, utilize confidence values in the collision determination. For example, the post-processing component 350 may include in a count of positive collision determinations those determinations that are associated with channels (e.g., audio data sensor channels) having a confidence value that is equal to or greater than a threshold confidence value while not including in the count of positive collision determinations those determinations that are associated with channels having a confidence value less than the threshold confidence value. Alternatively, or in addition, the post-processing component 350 may include in a count of positive collision determinations those determinations that are classified as a collision with a classification confidence value that is equal to or greater than a threshold confidence value while not including in the count of positive collision determinations those that are classified as a collision but with a classification confidence value less than the threshold confidence value. Other combinations of positive collision determinations, confidence values, and other criteria are contemplated.

The post-processing component 350 may also, or instead, determine time-related data for a detected collision to include in the collision detection data 303. For example, the post-processing component 350 may determine, for a particular positive collision determination, an onset time or timestamp and/or an offset time or timestamp (e.g., a time of collision initiation and/or cessation). In examples where multiple positive collision determinations are indicated in audio data associated with multiple channels, the collision onset and offset times may vary across the multiple channels.

In such examples, the post-processing component 350 may determine the channel having a highest confidence value from among those channels reporting a detected collision and may select the onset and/or offset time reported by that channel as the collision onset and offset times. Alternatively, the post-processing component 350 may determine a set of channels (e.g., three) having the highest confidence values from among those channels reporting a detected collision and may select the onset and/or offset time reported by those channels as the collision onset and offset times. In various examples, the post-processing component 350 may include in the collision detection data 303 the onset and/or offset times reported by all channels indicating a detected collision. In examples, the post-processing component 350 may include in the collision detection data 303 the confidence values of the one or more channels associated with the one or more onset and offset times included in the collision detection data 303. In various examples, the post-processing component 350 may use an aggregated or averaged times of onset and/or offset to determine a single onset and/or offset time to include in the collision detection data 303. For example, the post-processing component 350 may average or aggregate the onset and offset times for each channel that has met the confidence threshold and/or is included in those the count of positive collision determinations that meet a collision detection threshold. Alternatively, or in addition, the post-processing component 350 may use times of onset and/or offset associated with a highest confidence channel and/or collision classification to determine an onset and/or offset time to include in the collision detection data 303. Other techniques and/or algorithms to determine an onset and/or offset time to include in collision detection data are contemplated.

In examples where the audio sensor data 301 reflects a stream of audio data, the operations performed by the post-processing component 350 may be performed periodically or per frame of audio data. For example, the audio sensor data 301 may be received as data frames representing a period of time (e.g., 10 ms, 20 ms, 30 ms, etc.). For each such frame, the post-processing component 350 may determine whether a collision was detected and, if so, generate the collision detection data 303 for each such collision.

The system 300 may also, or instead, include a collision localization component 360 that may be configured for determining a potential collision location on a vehicle and including associated data in collision location estimate 304. In examples, the collision localization component 360 may determine the collision location estimate 304 in response to determining or detecting an indication that a collision has occurred (e.g., based on the collision detection data 303 and/or data received from the post-processing component 350). Alternatively, the collision localization component 360 may be configured to perform potential collision locating operations regardless of any collision determination.

The collision localization component 360 may use the data determined by the CNN classifier 330 based on the audio sensor data 301 (e.g., for individual audio sensors) to determine a score for the audio sensor data 301 that can be used to determine a collision location. In examples, the collision localization component 360 may determine one or more energy values for individual sets or streams of audio sensor data 301 (e.g., audio energy associated with a particular channel and/or audio sensor). In examples, this energy value may be a feature determined or extracted from the audio data, for example, provided by the noise suppression component 310 or by the feature extraction component 320 to the collision localization component 360. Alternatively, or in addition, this energy value may be determined by, or based on data determined by, the CNN classifier 330 using a machine-learned model. Alternatively, or in addition, audio energy data may be included in the audio sensor data 301 and/or determined by the collision localization component 360 based on the audio sensor data 301.

The collision localization component 360 may use a confidence value associated with a respective channel and/or sensor (e.g., associated with an individual dataset or stream of audio sensor data 301) in conjunction with an energy value for that channel and/or sensor to determine a collision location score the associated audio sensor data. In examples, this confidence value may be received as part of the audio sensor data 301 and passed to the collision localization component 360 by the noise suppression component 310. Alternatively, or in addition, this confidence value may be a feature extracted from the audio data, for example, by the feature extraction component 320. Alternatively, or in addition, this confidence value may be determined by, or based on data determined by, the CNN classifier 330 using a machine-learned model. Using these collision location scores, the collision localization component 360 may determine an estimated collision location and the collision location estimate 304.

The collision localization component 360 may also, or instead, use a classification of sounds (e.g., as determined by the CNN classifier 330 and/or as received from the noise suppression component 310) to determine a collision location. For example, the system may determine those channels and/or sensors associated with data classified as a collision (e.g., a low impact collision) and may then determine scores as described herein for such channels and/or sensors. In such examples, the collision localization component 360 may provide such classifications with the collision location estimate 304.

In examples, the collision localization component 360 may determine more than one collision location (e.g., based on a set of highest scores) and may include the multiple collision locations in the collision location estimate 304. The collision localization component 360 may also, or instead, include in the collision location estimate 304 a corresponding confidence value and/or classification associated with a collision location estimate indicted in the collision location estimate 304 (e.g., confidence values associated with the sensor, channel, data stream, etc. that may be associated with a score used to determine the respective collision locations).

In examples, where audio sensor data 301 includes multiple sets of audio sensor data indicating data originating at multiple sensors, the collision localization component 360 may use the scores determined for the individual sets of audio data to determine the location of a collision represented in at least one of the multiple sets of audio data. For example, the collision localization component 360 may determine that the impact is most proximate to a sensor associated with a set of audio data having the highest score (e.g., as determined at based on energy and confidence as described herein). Alternatively, the collision localization component 360 may use an algorithm or other process that may use more than one score to determine an impact location. For instance, where there are two scores higher than other scores, the vehicle computing system may use an algorithm to estimate an impact location between the sensors associated with the two higher scores.

FIG. 4 illustrates an example of an autonomous vehicle 400, in which the techniques discussed herein may be implemented. The autonomous vehicle may be configured to operate according to a Level 5 classification. The Level 5 classification was issued in 2016 by the U.S. National Highway Traffic Safety Administration and describes a vehicle capable of performing all safety-critical functions for the entire trip, with the driver (or occupant(s)) not being expected to control the vehicle at any time. In that case, since the vehicle may be configured to control all functions from start to stop, including all parking functions, it may be unoccupied. This is merely an example, and the systems and methods described herein may be incorporated into any ground-borne vehicle, also including conventional automobiles in which all vehicular control is performed by a driver and vehicles that are partially autonomously controlled, such that they can be autonomously controlled without driver attention or assist during certain driving conditions, such as, for example, while operating on limited-access highways. Such partially autonomously controlled vehicle may require driver attention and/or assistance during other driving conditions, such as, for example, while operating on city streets in urban areas, or during at least some parking functions.

As illustrated in FIG. 4, the vehicle 400 has a body 402 generally defining an exterior of the vehicle (e.g., surfaces exposed to the environment in which the vehicle 400 is operating). The body 402 may be disposed on or more generally include a frame or one or more additional support structures (not shown), as is conventionally known. In the example vehicle 400, the body 402 may include a first exterior surface 404 at a first end, and a second exterior surface (not visible in FIG. 4) at a second end opposite the first end. The first exterior surface 404 and the second exterior surface are separated along a longitudinal axis X by a vehicle length. The body 402 also includes side or lateral exterior surface 406 (one of which is shown), extending between the first end and the second end of the vehicle 400, and separated along a lateral axis Y, by a vehicle width. The body 402 may further include one or more doors, e.g., comprising all or part of on one or both of the lateral sides 406, for facilitating ingress and egress to and from an interior space of the vehicle 400. The vehicle 400 may also include a windshield and/or other windows, e.g., comprising some or all of the exterior surface 404, 406. As the vehicle 400 may be embodied as an autonomous vehicle, windshields and/or windows may not be required.

As further illustrated in FIG. 4, the vehicle 400 is transported by wheels 408 (the vehicle may have four wheels, two of which are shown in FIG. 4). Although the example vehicle 400 has four wheels, the systems and methods described herein may be incorporated into vehicles having fewer or a greater number of wheels, and/or tracks. Portions of the wheels 408 may be equipped with a protective covering e.g., bumpers or fenders. Such protective covering may be a portion of the body 402 and/or the exterior surfaces 404, 406. The example vehicle 400 may have four-wheel steering and may operate generally with equal performance characteristics in all directions e.g., in a first direction where the first end is the leading end of the vehicle 400, and a second direction, opposite the first direction, where the second end is the leading end of the vehicle 400. The vehicle 400 may be powered by one or more internal combustion engines, one or more batteries and electric motors, hydrogen fuel cells, or any combination thereof (none of which are shown).

The example vehicle 400 includes one or more sensors 410A-L, mounted on, or otherwise coupled to the body 402 of the vehicle 400. The sensors 410A-L may be configured about the body of the vehicle 400 such that they are capable of detecting sound around the entire perimeter of the vehicle 400 (e.g., 360-degree detection about the vehicle in the horizontal plane). One or more of the sensors 410A-L may be configured at any location on a body of the vehicle 400 (e.g., roof, right side, left side, front, rear, etc.). Data generated by the sensor(s) 410A-L may be used to sense low energy and/or low impact collisions with the vehicle 400, as detailed further herein. The sensors 410A-L associated with the vehicle 400 may include one or more types or modalities. For instance, the sensors 410A-L may include electromechanical sensors, such as impact sensors (e.g., fiber-optic sensors, pressure tubes, piezoelectric or resistive thin film sensors), inertial sensors (e.g., inertial measurement units (IMUs), accelerometers), and/or proximity sensors (e.g., capacitive, microwave, optical/infrared, or ultrasonic proximity sensors). The sensors 410A-L may also, or instead, include acoustic or audio sensors, such as resistive, capacitive, fiber-optic, piezoelectric or electret microphones, directional microphones, and/or surface acoustic wave (SAW) devices. The acoustic sensors may be set up as a wireless acoustic sensor network (WASN), or as a traditional (wired) array. In examples, the sensors 410A-L may be twelve individual audio sensors positioned about the body 402 of the vehicle 400 as shown in FIG. 4 (e.g., pairs of sensors at the front and the rear of the vehicle 400 and pairs at the sides above each wheel). In examples, one or more of the sensors 410A-L may be configured at the roof level or in a relatively elevated location on the vehicle 400.

The vehicle 400 may also be equipped with one or more other sensors mounted on or otherwise coupled to the body 402 of the vehicle 400. In examples of this disclosure, data generated by such sensors may enables autonomous or semi-autonomous vehicle operations, e.g., for vehicle navigation, obstacle avoidance, collision handling, or the like. These sensors may include a number of modalities, including but not limited to light detection and ranging (LIDAR) sensors, RADAR sensors, ultrasonic transducers, sonar sensors, location sensors (e.g., global navigation satellite system (GNSS) (including global positioning systems (GPS)), compass, etc.), inertial sensors (e.g., inertial measurement units (IMUs), accelerometers, magnetometers, gyroscopes, etc.), cameras (e.g., red-green-blue (RGB), infrared (IR), intensity, depth, etc.), time of flight sensors, microphones, wheel encoders, and/or environment sensors (e.g., temperature sensors, humidity sensors, light sensors, pressure sensors, etc.). Although example modalities of the sensors 410A-L provided above may be different from the example modalities of the other sensors that may be configured at the vehicle 400, in some instances, the some or all of such sensors may include the same modalities and/or the same sensors. This description may distinguish between the sensors 410A-L as sensors generating data used for a first purpose or first purposes, e.g., for determining low impact collisions, and other sensors generating data used for another (different) purpose or purposes, e.g., for normal driving operations. However, the sensors 410A-L and other sensors configured at the vehicle 400 may be the same sensors and/or sensor modalities in some examples. Without limitation, data from a single sensor may be used for the first purpose(s) as well as for the second purpose(s), so that sensor may be associated with both the sensors 410A-L and other sensors described herein.

The vehicle 400 may be equipped with a safety system (not shown) that may include an air bag, an air curtain system, seat belt tensioners, or the like. For example, in conventional safety systems, sensors configured at the vehicle 400 may include an accelerometer placed proximate to the front of the vehicle 400, generally along the longitudinal axis X. When the front of a vehicle 400 collides with an object, e.g., in a head-on collision, the accelerometers sense a drastic change in acceleration, and an airbag is deployed. In general, the conventional safety system includes any vehicular impact-mitigation system, which may be an internal safety system designed to directly interact with passengers and/or cargo carried by the vehicle, and/or an external safety system, which may be designed to deploy or otherwise activate outside the vehicle to protect the vehicle and/or the passengers/cargo in the vehicle. Internal safety system may include, for example, one or more airbags, air curtains, restraint systems, or the like. External safety systems may include external bladders, active bumper devices, or the like.

The conventional safety systems just described are generally used to mitigate damage to the vehicle 400, to passengers in the vehicle 400, and/or to cargo in the vehicle 400 in relatively higher impact collisions. For instance, lower impact or relatively minor collisions, such as fender-benders, parking lot mishaps, curb bumps, objects impacting the body 402 of the vehicle 400, no- or low-speed collisions, and the like, may not be detected using these conventional safety systems. In fact, it may be undesirable in some instances to employ conventional safety systems in response to these relatively minor collisions. For example, it may be undesirable to deploy airbags in response to a windblown shopping cart bumping into a door of the vehicle 400.

Although conventional safety systems are generally used to detect and/or respond to higher impact collisions, it may still be desirable to identify lower-impact collisions. For example, these lower impact collisions may still result in damage to the vehicle 400, to an object striking the vehicle 400, or the like. Aspects of this disclosure are directed to identifying these lower-impact and/or collisions.

In some examples, a collision may be characterized based on an impact energy level of the collision. For example, a collision with an impact energy of collision equal to or more than a threshold level (e.g., five thousand Joules) may be a "high-impact" or "relatively higher impact" collision, whereas, a collision with an impact energy below the threshold level may be a "low-impact" or "relatively lower impact" type of collision. A low-energy impact collision may result from a low- or medium-velocity impact with a medium-mass object, such as a collision with a bicycle or a scooter, a low- or medium-velocity impact with a low-mass object, such as an animal, pedestrian or a small object, or a low- or no-velocity impact with a high-mass object, e.g. contacting a barrier or another slow-moving or stationary vehicle in a parking lot. As already discussed, relatively higher-impact collisions may be detected and responded to by the conventional safety systems of the vehicle 400. However, conventional safety systems may not detect low-energy impact collisions, as conventional impact-mitigation systems such as airbags and seat belts are not needed to be engaged for ensuring passenger safety in the instance of such low-energy impact collisions. However, low-energy impact collisions may require the vehicle to perform some other actions in response.

Aspects of this disclosure are directed to an improved collision detection and response system in the instance of such low-energy impact collisions. More specifically, FIG. 4 illustrates a scenario in which, as the vehicle 400 traverses the environment, an object 414 (in the example, a ball) collides with the vehicle 400. The object impacts the body 402 of the vehicle 400 at an impact location 416. As will be appreciated, the object 414 colliding with the vehicle 400 is shown for example only; other examples of objects and/or of low-energy impact collisions are provided herein and will otherwise be appreciated with the benefit of this disclosure.

As shown in FIG. 4, examples of this disclosure may include a low impact collision detection and location system 420. The system 420 may be communicatively coupled to the sensors 410 and to one or more system controllers 440 of the vehicle 400. As described in more detail herein, the system 420 may receive sensor data 412 from the sensors 410 and determine control command(s) 430 based at least in part on the sensor data 412. The control command(s) 430 may indicate actions to be taken, e.g., bringing the vehicle to a stop, communicating with a tele-operator, storing operational data, moving the vehicle (e.g. in a particular directions and/or at a particular velocity), or the like. The system controller(s) 440 of the vehicle 400 perform the actions based on the control commands 430 received.

The system controller(s) 440 may communicate with and/or control corresponding systems of one or more drive systems and/or other components of the autonomous vehicle 400. For instance, the system controller(s) 440 may control steering, propulsion, braking, safety, emitters, communication, and/or other systems of the vehicle 400.

The low impact collision detection and location system 420 may generally implement various techniques to detect and/or respond to low-energy impact collisions involving the vehicle 400 and external objects 414 in the environment. As illustrated in FIG. 4, the system 420 may include a noise suppression component 421, a feature extraction component 422, a CNN 423, a collision detection component 424, a post-processing component 425, and a collision localization component 426. For example, as described in more detail herein the noise suppression component 421 may suppress background noise in the sensor data 412, the feature extraction component 422 may extract a feature set from the sensor data 412, the CNN 423 may classify the sounds represented in the sensor data 412, and the collision detection component 424 may determine whether a collision is represented in the sensor data 412. The post-processing component 425 may then determine whether a collision has been detected as described herein. The collision localization component 426 may also, or instead, process the sensor data 412 and/or data received from other components to determine an estimate of a location of a collision (e.g., the collision location 416 on the body 402 of the vehicle 400) as described herein.

The command generation component 427 may include functionality to generate one or more control commands 430 for responding to an event, such as a low energy or low impact collision. The control command(s) 430 can configure the system controller(s) 440 and/or other aspects of the vehicle 400 to perform one or more operations (e.g., bring the vehicle to a stop if currently moving, gather and transmit or store operational data related to the event (including, but not limited to, sensor data, control data, and any intermediate message data generated), initiate a communication with a tele-operator or other humans in or near the vehicle, etc.). In still further examples, the control command(s) 440 can configure the vehicle computing systems to generate and/or store data associated with other sensors configured at the vehicle 400 that may provide additional information (e.g., about the collision). Without limitation, the control command(s) 430 may configure a camera or other imaging device having a field of view in which the detected collision was determined to generate and/or store data that may provide further information about the impact event. For instance, the control command(s) 430 may cause the vehicle 400 to store data generated by one or more sensors for a predetermined amount of time (e.g., 30 seconds, 90 seconds, etc.) before and/or after a collision.

If a collision event (e.g., a low impact collision) is detected, the command generation component 427 may issue a control command 430 to bring the vehicle to a stop. The system controller(s) 440 may respond to this control command by decelerating the vehicle 400 to a stop (e.g., a gentle stop associated with a deceleration rate that is less than a maximum deceleration rate that is possible for the vehicle 400). For example, a gentle stop may include braking at a particular rate, such as a predetermined rate, a rate that is less than a first rate (e.g., maximum braking rate), a rate that is greater than a second rate (e.g., minimum braking rate), a rate from among a plurality of available rates that is substantially in the middle (e.g., a third rate from among five rates), a minimum rate from among a plurality of rates, and so on. A rate of deceleration may refer to a unit of measurement over time, such as a number of meters or feet per second squared ($m/s^2$ or $ft/s^2$). In one example, a gentle stop may include decelerating at a rate of 5 or 10 feet per second squared until the autonomous vehicle 400 comes to a stop.

The command generation component 427 may also respond to a low energy or low impact collision by issuing a control command 430 to initiate communications with a tele-operator. The system controller(s) 440 may respond to this control command by enabling a communication channel between a communication unit of the vehicle and a tele-operator, e.g., over a network. The communication channel may be used by the tele-operator to communicate with person(s) located in and around the vehicle 400. This may include passengers traveling in the vehicle 400 at the time of the low impact collision, police personnel responding to the scene of the collision, and other persons present in the vicinity of the vehicle at the time of the collision.

Further, the command generation component 427 may issue a control command 430 to store or transmit vehicle operational data after a low-energy impact collision event. In response, the system controller(s) 440 may gather and store vehicle operational data for an interval of time preceding and subsequent to the event. The vehicle operational data may include vehicle speed, heading, steering angle, as well as sensor data 412 from the sensors 410 disposed on the vehicle 400. The operational data may be stored locally in an on-board memory of the vehicle 400 or transmitted to an external computing system via a network.

In the instance that the post-processing component determine that no collision has been detected, the command generation component 427 may generate no control command(s) 430 and no action may be performed by the system controller(s) 440. However, in some examples, the command generation component 427 may generate control command(s) to store sensor data 412 and/or other operational data, for example if there is a false positive in a part of the sensor data 412. In response, the system controller(s) 440 may gather and store the data as described above.

Figure 5:
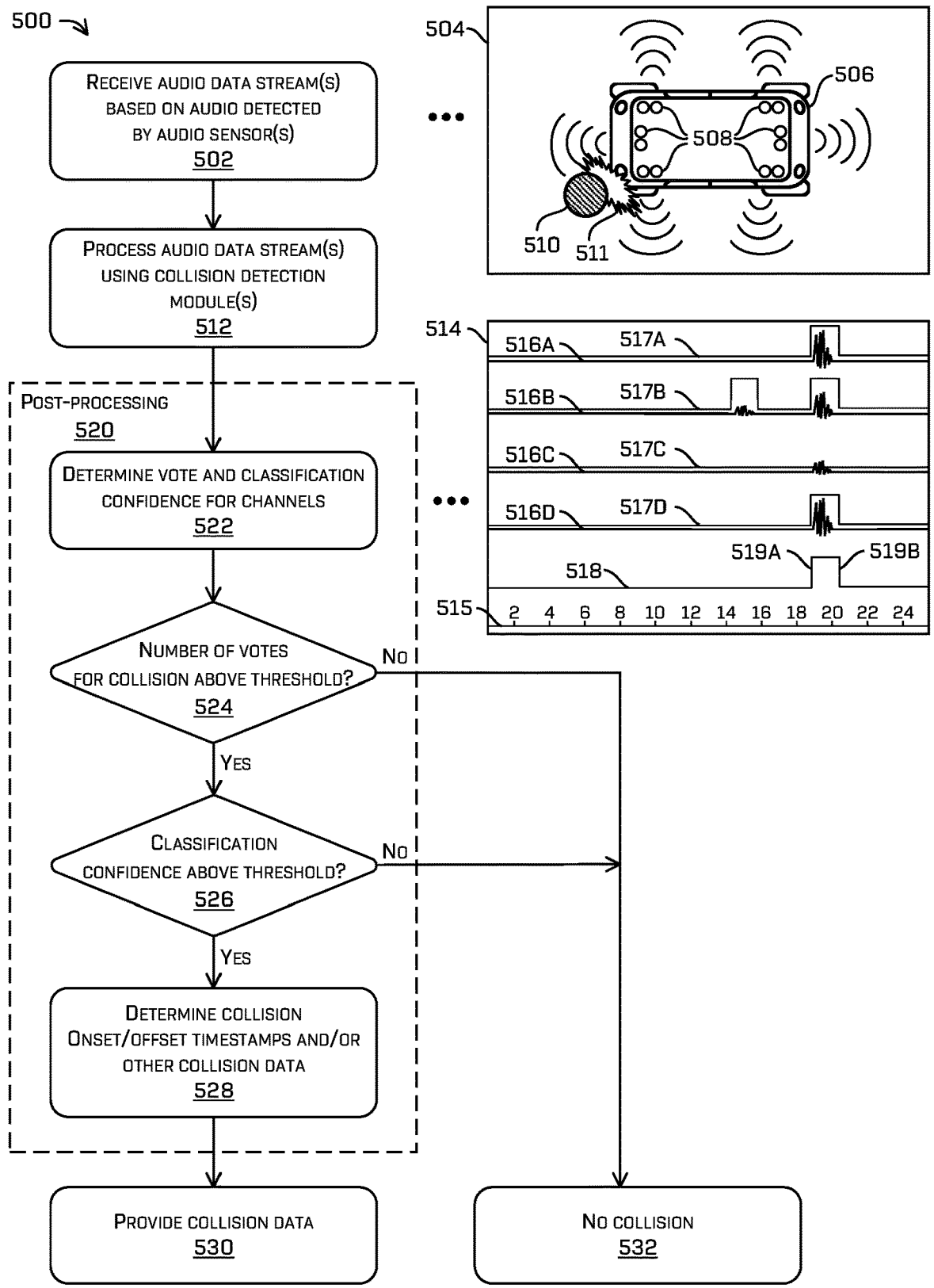
FIG. 5 illustrates an example process to determine a low impact collision, in accordance with examples of the disclosure.

FIG. 5 is a pictorial flow diagram of an example process 500 for detecting a low impact collision. In examples, one or more operations of the process 500 may be implemented by a vehicle computing system, such as by using one or more of the components and systems illustrated in FIGS. 4 and 7 and described herein. For example, one or more components and systems can include those associated with a low impact collision detection and location system 420 illustrated in FIG. 4 and/or one or more low impact collision detection and location components 732 illustrated in FIG. 7. In examples, the one or more operations of the process 500 may be performed by a remote system in communication with a vehicle, such as one or more low impact collision detection and location components 750 illustrated in FIG. 7. In still other examples, the one or more operations of the process 500 may be performed by a combination of a remote system and a vehicle computing systems. However, the process 500 is not limited to being performed by such components and systems, and the components and systems of FIGS. 4 and 7 are not limited to performing the process 500.

At operation 502, a vehicle computing system may receive one or more audio data streams from one or more respective sensors configured at a vehicle. For example, the vehicle computing system may receive individual audio data streams from individual audio sensors of multiple audio sensors configured at a vehicle. Alternatively, or in addition, at the operation 502 the vehicle computing system may receive one or more data structures representing one or more audio data streams or sets of audio data. For example, the vehicle computing system may receive a multichannel data structure with individual channels or layers of data associated with individual sensors and/or data originating therefrom. The data streams received at the operation 502 may be raw audio data and/or processed audio data. The audio data streams may represent one or more sounds and/or noises detected in an environment in which the vehicle may be operating.

An example 504 illustrates a top-down view of an environment that includes a vehicle 506 that may be configured with audio sensors 508 (e.g., microphones) to detect sounds in the environment. The sensor 508 may be configured about the vehicle 506 such that they are capable of detecting sound around the entire perimeter of the vehicle 1506 (e.g., 360- degree detection about the vehicle in the horizontal plane). One or more of the sensors 508 may be configured at any location on a body of the vehicle 506 (e.g., roof, right side, left side, front, rear, etc.). The sensors 508 configured at the vehicle 506 may be disposed at spatially separated locations about the vehicle 506 (e.g., along the perimeter of the roof, at the front and rear, and along the sides above the wheels). The sensors 508 may be configured to detect sounds such as a potential collision sound 511 emitted by an object 510 that may be colliding with the vehicle 506.

At operation 512, the vehicle computing system may process the audio data streams received at the operation 502 by, for example, suppressing the noise in the data streams, extracting feature sets from the streams, classifying the sounds in the streams, and/or determining confidence values for the streams and/or audio data (e.g., sounds) associated therewith. Any one or more of these operations may be performed a CNN using a machine-learned model.

After such processing, the vehicle computing system may initiate one or more post-processing operations 520 to determine whether a collision has been detected and, if so, to generate collision data. At operation 522, the vehicle computing system may determine, based on the processed audio data streams, a collision determination or collision "vote" for individual channels associated with the audio data streams.

An example 514 illustrates example time domain representations of audio signals 516A-D that may be represented by audio data streams for channels associated with sensors that may be configured at a vehicle, such as sensors 508 illustrated in the example 504. The example 514 further illustrates collision detection data 517A-D for such channels. The example 514 also includes a time scale 515 indicting time in milliseconds.

In this example, the vehicle computing system may have determined that the signal 516A corresponds to a collision, resulting in a positive collision determination 517A for the time period associated with the portion of the signal 516A indicating a collision. In the example 514, this positive collision determination may be represented as a square wave in collision detection data 517A proximate to the portion of the signal 516A associated with a collision detection. Thus, for the channel associated with the signal 516A, a positive collision determination, or vote, may be indicated for the time period associated with the square wave of 517A (e.g., approximately 19 ms-20.5 ms in reference to time scale 515).

Referring now to audio signal 516B, the vehicle computing system may have determined that the signal 516B corresponds to two collisions, resulting in two positive collision determinations 517B for the time periods associated with the portion of the signal 516B indicating collisions. These positive collision determinations may be represented as square waves in collision detection data 517B proximate to the portions of the signal 516B associated with a collision detections. Thus, for the channel associated with the signal 516B, a positive collision determination, or vote, may be indicated for the time periods associated with the square waves of 517A (e.g., approximately 14 ms-16 ms and 19 ms-20.5 ms in reference to time scale 515). Note that because none of the other signals 516A, 516C, or 516D have positive collision determinations that correspond to the first positive collision determination represented in collision detection data 517B, this first positive collision determination represented in collision detection data 517B may represent a false positive collision determination. Because of the voting logic techniques described herein, however, this false positive collision determination may not adversely affect the overall collision determination. More specifically, there may not be sufficient positive collision determinations in other channels to raise the number of votes for a collision detection at the time period of the first positive collision determination represented in collision detection data 517B to the minimum threshold of votes required for an overall positive collision determination. In this way, the adverse effects of the false positive collision determination represented in the collision detection data 517B may be reduced or eliminated.

Referring now to audio signal 516C, the vehicle computing system may have determined that the signal 516C corresponds to no collisions, resulting in no positive collision determinations represented in collision detection data 517C. However, as seen in the other signals and collision detection data illustrated in example 514, positive collision determinations may have been determined for (e.g., most of) the other signals and represented as square waves in the respective collision detection data. Thus, for the channel associated with the signal 516C, the collision detection data 517C may represent a false negative, that is, no collision detection despite a collision occurring, for example at approximately 19 ms-20.5 ms in reference to time scale 515. Because the other signals 516A, 516B, and 516D have positive collision determinations that correspond to this time period, the false negative collision determination represented in collision detection data 517C may not adversely affect the overall collision determination. More specifically, there may be sufficient positive collision determinations in other channels to raise the number of votes for a collision detection at this time period to the minimum threshold of votes required for an overall positive collision determination. In this way, the adverse effects of the false negative collision determination represented in the collision detection data 517C may be reduced or eliminated.

Referring now to audio signal 516D, the vehicle computing system may have determined that the signal 516D corresponds to a collision, resulting in a positive collision determination 517D for the time period associated with the portion of the signal 516D indicating a collision, represented by the square wave of 517D (e.g., approximately 19 ms-20.5 ms in reference to time scale 515).

At operation 524, the vehicle computing system may determine whether a number of positive collision determination represented by the collision detection data received at the operation 522 in a time period and associated with the various sensor channels meets a threshold. In various examples, this threshold may be a plurality of such channels, a majority of the channels, or any other threshold value or percentage (e.g., 75%, 90%, etc.).

For example, referring again to the example 514, the threshold for a collision determination may three "votes" or positive collision determinations from among the four channels reporting data, or 75% of the reporting channels indicating a positive collision determination in a time period at approximately the same time. The vehicle computing system may determine that a collision has been detected for the time period of approximately 19 ms-20.5 ms because a positive collision determination was made at or around that time period in three of the four channels, represented by the collision detection data 517A, 517B, and 517D.

If, at the operation 524, the vehicle computing system determines that a collision determination threshold has not been met, the process 500 may proceed to operation 532 for no collision detection, where one or more actions associated with no collision detection may be taken (e.g., storing and/or transmission of sensor data, collision data, audio data streams, etc.) or no resulting actions may be taken.

If, at the operation 524, the vehicle computing system determines that a collision determination threshold has been met, the process 500 may proceed to operation 526 to determine whether the confidence values associated with the individual channels (e.g., audio data sensor channels) indicating a positive collision determination are greater than a threshold value. In examples, a CNN may determine a confidence value for the individual channels associated with individual steams or sets of audio data. Such confidence values may be included in the data received at the operation 522. In such examples, the vehicle computing system may include in a vote count for collision determination only those channels have at least a minimum confidence value while not including in the vote count those channels having a confidence value less than the minimum confidence value.

Alternatively, or in addition, at the operation 526 the vehicle computing system may determine whether the confidence values associated with the individual collision determinations are greater than a threshold value. In examples, a CNN may determine a confidence value for the individual collision determination or associated classifications represented by streams or sets of audio data. Such confidence values may be included in the data received at the operation 522. In such examples, the vehicle computing system may include in a vote count for collision determination only those positive collision determinations that have at least a minimum confidence value while not including in the vote count those positive collision determinations having a confidence value less than the minimum confidence value.

Note that it is contemplated that the operations 524 and 526 may be interchange, performed in isolation, and/or in combination with any other operations. For example, channels having less than a minimum associated confidence value may not be evaluated for collision determinations at all (e.g., operation 526 may be performed before operation 524).

Further at operation 526, the vehicle computing system may determine whether there are at least a threshold number of channels of at least a threshold confidence value reporting a positive collision determination. If not, the process 500 may proceed to operation 532 for no collision detection, where one or more actions associated with no collision detection may be taken (e.g., storing and/or transmission of sensor data, collision data, audio data streams, etc.) or no resulting actions may be taken.

If, at the operation 526, the vehicle computing system determines that at least a threshold number of channels of at least a threshold confidence value are associated with a positive collision determination, the process 500 may proceed to operation 528 to determine collision data. Such collision data may include, other than an indication that a collision has been detected, a time of onset of the detected collision and/or a time of offset of the detected collision (e.g., a time of collision initiation and/or cessation). The vehicle computing system may represent such times as timestamps. The collision data may also include one or more confidence values associated with one or more onset and/or offset times (e.g., confidence values associated with the channels on which the onset/offset times are based).

In examples where multiple positive collision determinations are indicated in the collision detection data or audio sensor data associated with multiple channels, the collision onset and offset times may vary across the multiple channels. In such examples, the vehicle computing system may determine the channel having a highest confidence value from among those channels reporting a detected collision and may select the onset and/or offset time reported by that channel as the collision onset and offset times. Alternatively, the vehicle computing system may determine a set of channels (e.g., three) having the highest confidence values from among those channels reporting a detected collision and may select the onset and/or offset time reported by those channels as the collision onset and offset times. In various examples, the vehicle computing system may include in collision detection data the onset and/or offset times reported by all channels indicating a detected collision. In examples, the vehicle computing system may include in the collision detection data one or more confidence values for the respective one or more channels associated with the onset and offset times. In various examples, the post-processing component 350 may use an aggregated or averaged times of onset and/or offset to determine a single onset and/or offset time to include in the collision data generated at operation 528. Alternatively, or in addition, the vehicle computing system may use times of onset and/or offset associated with higher confidence collision classifications to determine an onset and/or offset time to include in the collision data. Other techniques and/or algorithms to determine an onset and/or offset time to include in collision detection data are contemplated For example, referring again to the example 514, the vehicle computing system may generate the collision data 518 based on determining that the threshold number of channels associated with the threshold confidence value (e.g., channels associated with collision detection data 517A, 517B, and 517D) indicated a positive collision determination. The collision data 518 may indicate (e.g., at the illustrated square wave) a collision event has been determined and/or that the collision event may have an onset timestamp 519A and an offset timestamp 519B.

At operation 530, the collision data determined at operation 528 may be provided for additional processing and/or storage. For example, the vehicle computing system may transmit this collision data to a remote system and/or remote operator (e.g., tele-operator) to initiate one or more responsive actions. In examples, the vehicle computing system may provide collision data to a collision localization system or process as described herein for the determination of a collision location estimate.

In examples, one or more responsive actions taken at operation 530 may be taken based in part on other data, such as collision location data (e.g., determined as described herein). In examples, in response to detecting a collision, the vehicle computing system may perform diagnostic operations (e.g., using one or more sensors proximate to the collision), control the vehicle to move away from a location in the environment where the collision occurred, control the vehicle to operate such that the location of collision on the vehicle (e.g., on the vehicle body) is at the trailing end of the vehicle, contact emergency authorities, request manual vehicle control (e.g., from a tele-operator), transmit sensor and/or collision data to remote storage (e.g., a permanent data storage system, a cloud storage system, etc.), disable one or more sensors (e.g., one or more sensors proximate to the collision), etc.

Figure 6:
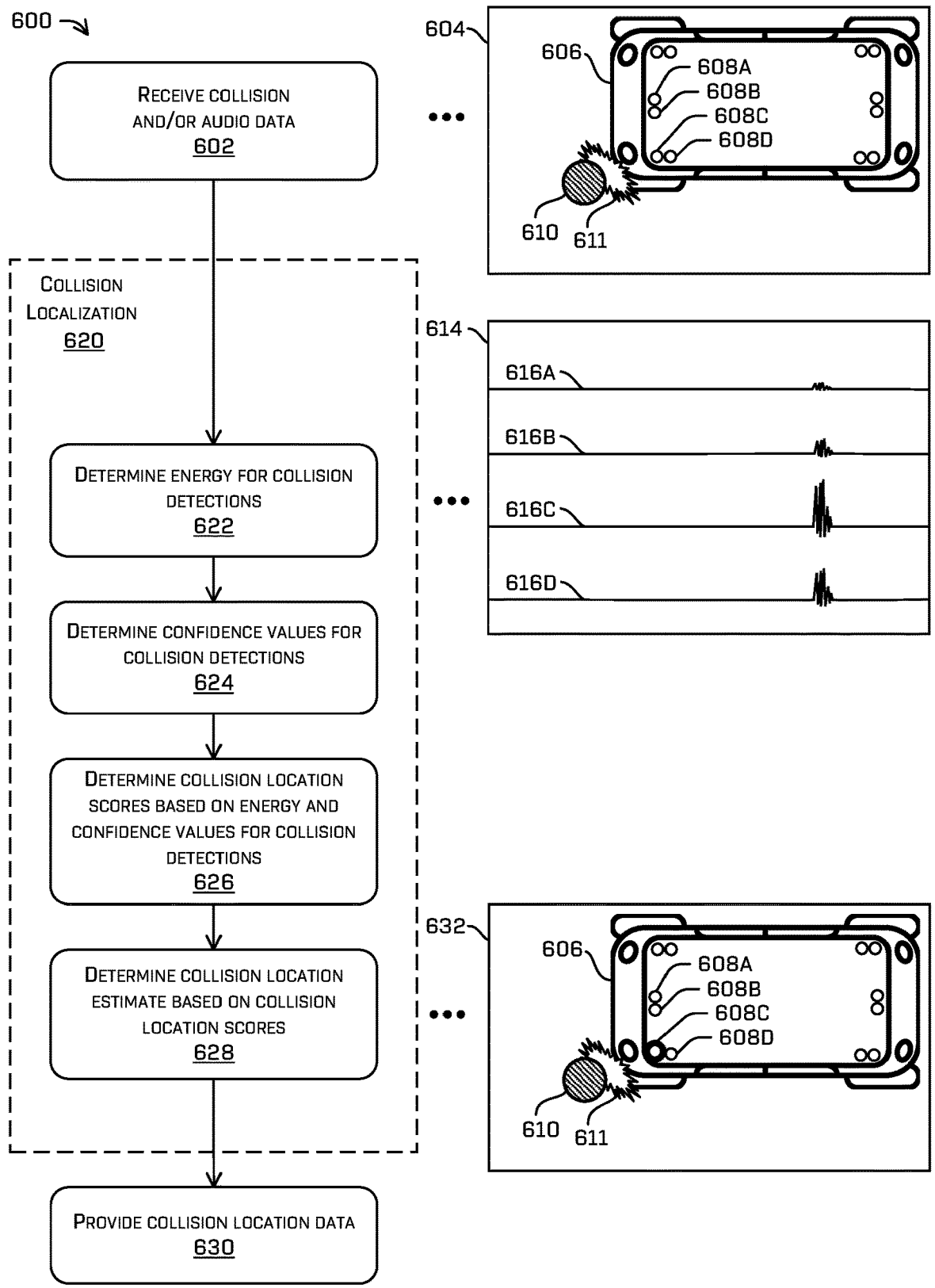
FIG. 6 illustrates an example process to localize a low impact collision, in accordance with examples of the disclosure.

For example, FIG. 6 is a pictorial flow diagram of an example process 600 for determining a location of a low impact collision. In examples, one or more operations of the process 600 may be implemented by a vehicle computing system, such as by using one or more of the components and systems illustrated in FIGS. 4 and 7 and described herein. For example, one or more components and systems can include those associated with a low impact collision detection and location system 420 illustrated in FIG. 4 and/or one or more low impact collision detection and location components 732 illustrated in FIG. 7. In examples, the one or more operations of the process 600 may be performed by a remote system in communication with a vehicle, such as one or more low impact collision detection and location components 750 illustrated in FIG. 7. In still other examples, the one or more operations of the process 600 may be performed by a combination of a remote system and a vehicle computing systems. However, the process 600 is not limited to being performed by such components and systems, and the components and systems of FIGS. 4 and 7 are not limited to performing the process 600.

At operation 602, a vehicle computing system may receive collision data and/or audio data that may be associated with a detected collision. For example, at operation 602 the vehicle computing system may receive data such as that generated by the process 500, generated by a CNN such as CNN 330 of FIG. 3, and/or data such as that generated at operation 120 of FIG. 1. This data may include an indication of a collision event and/or any associated data. In such examples, the vehicle computing system may perform the process 600 in response to a positive collision determination. However, in other examples, the vehicle computing system may perform the process 600 in parallel with, or instead of, performing one or more operations of a low impact collision detection process as describe herein. For example, at the operation 602, the vehicle computing system may receive one or more audio data streams from one or more respective sensors configured at a vehicle, for instance as individual audio data streams from individual audio sensors of multiple audio sensors configured at a vehicle. Alternatively, or in addition, at the operation 602 the vehicle computing system may receive one or more data structures representing collision data, audio sensor data, and/or one or more audio data streams or sets of audio data. For example, the vehicle computing system may receive a multichannel data structure with individual channels or layers of collision data associated with individual sensors and/or data originating therefrom. The data received at the operation 602 may be processed (e.g., as described herein) audio data representing a detected collision (e.g., a low impact collision).

An example 604 illustrates a top-down view of an environment that includes a vehicle 606 that may be configured with audio sensors 608A-D (e.g., microphones) to detect sounds in the environment. As illustrated, the vehicle 606 may be configured with other sensors as well. The sensors 608A-D may be configured to detect sounds such as a potential collision sound 611 generated by an object 610 colliding with the vehicle 606. The sensors 608A-D may be configured about the vehicle 606 such that they are capable of detecting sound around the entire perimeter of the vehicle 606 (e.g., 360-degree detection about the vehicle in the horizontal plane). One or more of the sensors 608A-D may be configured at any location on a body of the vehicle 606 (e.g., roof, right side, left side, front, rear, etc.).

At operation 622, the vehicle computing system may process the collision and/or audio data received at the operation 602 to determine one or more energy values for the associated audio data (e.g., audio energy associated with a particular channel and/or audio sensor). These energy values may be determined by a neural network using a machine-learned model and provided with the data relieved at the operation 602, passed through as part of the audio data received from the audio sensor, and/or determined at operation 622.

An example 614 illustrates example representations of audio energy 616A-D that may be represented by and/or determined from the collision and/or audio data for channels associated with sensors that may be configured at a vehicle, such as sensors 608A-D illustrated in the example 604. For example, energy 616A may be associated with sensor 608A, energy 616B may be associated with sensor 608B, energy 616C may be associated with sensor 608C, and energy 616D may be associated with sensor 608D. As shown in this example, the sensor 608C may be associated with the highest energy 616C, with energy 616D associated with the sensor 608D being the next highest, followed by energy 616B associated with the sensor 608B, with the lowest energy detection shown being energy 616A associated with the sensor 608A. As can be seen in the example 604, this corresponds to the collision 611 being most proximate to the sensor 608C and second most proximate to the sensor 608D, followed in proximity to the sensor 608B and then the sensor 608A.

At operation 624, the vehicle computing system may process the collision and/or audio data received at the operation 602 to determine one or more confidence values for the associated audio data (e.g., confidence values associated with a particular channel and/or audio sensor, confidence values associated with a particular collision detection, confidence values associated with a particular sounds classification (e.g., low impact collision), etc.). As with energy values, these confidence values may be determined by a neural network using a machine-learned model and provided with the data relieved at the operation 602, passed through as part of the audio data received from the audio sensor, and/or determined at operation 622.

At operation 626, the vehicle computing system may use the energy values determined at the operation 622 in combination with the confidence values determined at the operation 624 to determine a collision location score for individual channels, sensors, and/or collision detections associated with particular individual channels and/or sensors. For example, a collision location score s for a particular set or stream of audio data may be represented as $s = \alpha * energy - (1-\alpha) * confidence$.

At operation 628, the vehicle computing system may determine a collision location based on the collision location scores determined at the operation 626. For example, the vehicle computing device may determine that the location of a sensor associated with a highest collision location score (e.g., associated with a channel or collision detection having the highest collision location score) from among the scores determined at the operation 626 is the location of the detected collision. In other examples, the vehicle computing system may determine the collision location using an algorithm or technique based on the collision location scores determined at the operation 626. For instance, where there are two scores higher than any other scores, the vehicle computing system may use an algorithm to estimate a collision location between the sensors associated with those scores. In such algorithms and techniques, higher scores and/or scores associated with greater confidence values may be weighted higher while other scores may be taken into account but weighted lower. For example, the vehicle computing system may determine that a collision location is between two sensors having higher associated collision location scores than any other sensors, but closer to the one sensor of the two that has the highest score. In examples, the vehicle computing device may determine more than one collision location at the operation 628 (e.g., based on a set of highest scores) and may provide the multiple collision locations (e.g., at operation 630). For example, the vehicle computing system may determine three collision locations at operation 628 based on the three highest scores and/or the three highest confidence values associated with scores and/or locations.

An example 632 illustrates a top-down view of the environment that includes the vehicle 606. As shown in this example, the vehicle 606's computing system may have determined that the sensor 608C (highlighted in this example) has the highest collision location score and therefore is the estimated location of the collation 611.

At operation 630, the vehicle computing system may provide the collision location data and/or any associated data for additional processing and/or storage. In examples, the vehicle computing system may provide one or more confidence value associated with one or more collision location estimates (e.g., confidence values associated with the sensor, channel, data stream, etc. that may be associated with a score used to determine the respective collision locations) at operation 630. In examples, the vehicle computing system may transmit this collision location data to a remote system and/or remote operator to initiate one or more responsive actions.

FIG. 7 depicts a block diagram of an example system 700 for implementing the techniques described herein. In at least one example, the system 700 can include a vehicle 702. The vehicle 702 can include a vehicle computing device 704 that may function as and/or perform the functions of a vehicle controller for the vehicle 702. The vehicle 702 can also include one or more sensor systems 706, one or more emitters 708, one or more communication connections 710, at least one direct connection 712, and one or more drive systems 714.

The vehicle computing device 704 can include one or more processors 716 and memory 718 communicatively coupled with the one or more processors 716. In the illustrated example, the vehicle 702 is an autonomous vehicle; however, the vehicle 702 could be any other type of vehicle. In the illustrated example, the memory 718 of the vehicle computing device 704 stores a localization component 720, a perception component 722, a planning component 724, one or more system controllers 726, one or more maps 728, a prediction component 730, and one or more low impact collision detection and location components 732. Though depicted in FIG. 7 as residing in memory 718 for illustrative purposes, it is contemplated that each of the localization component 720, the perception component 722, the planning component 724, the one or more system controllers 726, the one or more maps 728, the prediction component 730, and the one or more low impact collision detection and location components 732 can additionally, or alternatively, be accessible to the vehicle 702 (e.g., stored remotely).

In at least one example, the localization component 720 can include functionality to receive data from the sensor system(s) 706 to determine a position and/or orientation of the vehicle 702 (e.g., one or more of an x-, y-, z-position, roll, pitch, or yaw). For example, the localization component 720 can include and/or request/receive a map of an environment and can continuously determine a location and/or orientation of the autonomous vehicle within the map. In some instances, the localization component 720 can utilize SLAM (simultaneous localization and mapping), CLAMS (calibration, localization and mapping, simultaneously), relative SLAM, bundle adjustment, non-linear least squares optimization, or the like to receive image data, LIDAR data, radar data, IMU data, GPS data, wheel encoder data, and the like to accurately determine a location of the autonomous vehicle. In some instances, the localization component 720 can provide data to various components of the vehicle 702 to determine an initial position of an autonomous vehicle for generating a trajectory and/or for generating map data, as discussed herein.

In some instances, the perception component 722 can include functionality to perform object detection, segmentation, and/or classification. In some examples, the perception component 722 can provide processed sensor data that indicates a presence of an entity that is proximate to the vehicle 702 and/or a classification of the entity as an entity type (e.g., car, pedestrian, cyclist, animal, building, tree, road surface, curb, sidewalk, traffic signal, traffic light, car light, brake light, unknown, etc.). In additional or alternative examples, the perception component 722 can provide processed sensor data that indicates one or more characteristics associated with a detected entity (e.g., a tracked object) and/or the environment in which the entity is positioned. The perception component 722 may use the multichannel data structures as described herein, such as the multichannel data structures generated by the described deconvolution process, to generate processed sensor data. In some examples, characteristics associated with an entity or object can include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Such entity characteristics may be represented in a multichannel data structure as described herein (e.g., a multichannel data structure generated as output of one or more deconvolution layers (e.g., learned deconvolutional upsampling decoding layer(s)) using a learned upsampling transformation). Characteristics associated with the environment can include, but are not limited to, a presence of another entity in the environment, a state of another entity in the environment, a time of day, a day of a week, a season, a weather condition, an indication of darkness/light, etc.

In general, the planning component 724 can determine a path for the vehicle 702 to follow to traverse through an environment. In examples, the planning component 724 can determine various routes and trajectories and various levels of detail. For example, the planning component 724 can determine a route (e.g., planned route) to travel from a first location (e.g., a current location) to a second location (e.g., a target location). For the purpose of this discussion, a route can be a sequence of waypoints for travelling between two locations. As non-limiting examples, waypoints include streets, intersections, global positioning system (GPS) coordinates, etc. Further, the planning component 724 can generate an instruction for guiding the autonomous vehicle along at least a portion of the route from the first location to the second location. In at least one example, the planning component 724 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique, wherein one of the multiple trajectories is selected for the vehicle 702 to navigate.

In at least one example, the vehicle computing device 704 can include one or more system controllers 726, which can be configured to control steering, propulsion, braking, safety, emitters, communication, and other systems of the vehicle 702. These system controller(s) 726 can communicate with and/or control corresponding systems of the drive system(s) 714 and/or other components of the vehicle 702.

The memory 718 can further include one or more maps 728 that can be used by the vehicle 702 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), non-visible light information (near-infrared light information, infrared light information, and the like), intensity information (e.g., lidar information, radar information, near-infrared light intensity information, infrared light intensity information, and the like); spatial information (e.g., image data projected onto a mesh, individual "surfels" (e.g., polygons associated with individual color and/or intensity)); and reflectivity information (e.g., specularity information, retroreflectivity information, BRDF information, BSSRDF information, and the like). In an example, a map can include a three-dimensional mesh of the environment. In some instances, the map can be stored in a tiled format, such that individual tiles of the map represent a discrete portion of an environment, and can be loaded into working memory as needed, as discussed herein. In at least one example, the one or more maps 728 can include at least one map (e.g., images and/or a mesh). In some examples, the vehicle 702 can be controlled based at least in part on the maps 728. That is, the maps 728 can be used in connection with the localization component 720, the perception component 722, and/or the planning component 724 to determine a location of the vehicle 702, identify objects in an environment, and/or generate routes and/or trajectories to navigate within an environment.

In some examples, the one or more maps 728 can be stored on a remote computing device(s) (such as the computing device(s) 742) accessible via network(s) 740. In some examples, multiple maps 728 can be stored based on, for example, a characteristic (e.g., type of entity, time of day, day of week, season of the year, etc.). Storing multiple maps 728 can have similar memory requirements but increase the speed at which data in a map can be accessed.

In general, the prediction component 730 can generate predicted trajectories of objects in an environment. For example, the prediction component 730 can generate one or more predicted trajectories for vehicles, pedestrians, animals, and the like within a threshold distance from the vehicle 702. In some instances, the prediction component 730 can measure a trace of an object and generate a trajectory for the object based on observed and predicted behavior.

In some instances, aspects of some or all of the components discussed herein can include any models, algorithms, and/or machine learning algorithms. For example, in some instances, the components in the memory 718 (and the memory 746, discussed below) can be implemented as a neural network. For instance, the memory 718 may include a deep tracking network that may be configured with a convolutional neural network (CNN). The CNN may include one or more convolution/deconvolution layers. Alternatively, or in addition, the one or more low impact collision detection and location components 732 may include a CNN that may perform operation as described herein.

An example neural network is an algorithm that passes input data through a series of connected layers to produce an output. Each layer in a neural network can also comprise another neural network or can comprise any number of layers, each of which may convolutional, deconvolutional, or another type of layer. As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure, for example, to determine a learned upsampling transformation. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

In at least one example, the sensor system(s) 706 can include radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, etc.), time of flight sensors, audio sensors, acoustic sensors, microphones, wheel encoders, environment sensors (e.g., temperature sensors, humidity sensors, light sensors, pressure sensors, etc.), etc. The sensor system(s) 706 can include multiple instances of each of these or other types of sensors. For instance, the camera sensors can include multiple cameras disposed at various locations about the exterior and/or interior of the vehicle 702. The sensor system(s) 706 can provide input to the vehicle computing device 704. Additionally, or alternatively, the sensor system(s) 706 can send sensor data, via the one or more networks 740, to the one or more computing device(s) at a particular frequency, after a lapse of a predetermined period of time, in near real-time, etc.

The vehicle 702 can also include one or more emitters 708 for emitting light (visible and/or non-visible) and/or sound. The emitter(s) 708 in an example include interior audio and visual emitters to communicate with passengers of the vehicle 702. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 708 in this example may also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology. The exterior emitters in this example may also, or instead, include non-visible light emitters such as infrared emitters, near-infrared emitters, and/or lidar emitters.

The vehicle 702 can also include one or more communication connection(s) 710 that enable communication between the vehicle 702 and one or more other local or remote computing device(s). For instance, the communication connection(s) 710 can facilitate communication with other local computing device(s) on the vehicle 702 and/or the drive system(s) 714. Also, the communication connection(s) 710 can allow the vehicle to communicate with other nearby computing device(s) (e.g., other nearby vehicles, traffic signals, etc.). The communications connection(s) 710 also enable the vehicle 702 to communicate with a remote teleoperations computing device or other remote services.

The communications connection(s) 710 can include physical and/or logical interfaces for connecting the vehicle computing device 704 to another computing device or a network, such as network(s) 740. For example, the communications connection(s) 710 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 702 can include one or more drive systems 714. In some examples, the vehicle 702 can have a single drive system 714. In at least one example, if the vehicle 702 has multiple drive systems 714, individual drive systems 714 can be positioned on opposite ends of the vehicle 702 (e.g., the front and the rear, etc.). In at least one example, the drive system(s) 714 can include one or more sensor systems to detect conditions of the drive system(s) 714 and/or the surroundings of the vehicle 702. By way of example and not limitation, the sensor system(s) 706 can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders can be unique to the drive system(s) 714. In some cases, the sensor system(s) on the drive system(s) 714 can overlap or supplement corresponding systems of the vehicle 402 (e.g., sensor system(s) 406).

The drive system(s) 714 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 714 can include a drive system controller which can receive and preprocess data from the sensor system(s) and to control operation of the various vehicle systems. In some examples, the drive system controller can include one or more processors and memory communicatively coupled with the one or more processors. The memory can store one or more components to perform various functionalities of the drive system(s) 714. Furthermore, the drive system(s) 714 may also include one or more communication connection(s) that enable communication by the respective drive system with one or more other local or remote computing device(s).

In at least one example, the direct connection 712 can provide a physical interface to couple the one or more drive system(s) 714 with the body of the vehicle 702. For example, the direct connection 712 can allow the transfer of energy, fluids, air, data, etc. between the drive system(s) 714 and the vehicle. In some instances, the direct connection 712 can further releasably secure the drive system(s) 714 to the body of the vehicle 702.

In some examples, the vehicle 702 can send sensor data, audio data, collision data, and/or other types of data to one or more computing device(s) 742 via the network(s) 740. In some examples, the vehicle 702 can send raw sensor data to the computing device(s) 742. In other examples, the vehicle 702 can send processed sensor data and/or representations of sensor data (e.g., multichannel data structures representing sensor data) to the computing device(s) 742. In some examples, the vehicle 702 can send sensor data to the computing device(s) 742 at a particular frequency, after a lapse of a predetermined period of time, in near real-time, etc. In some cases, the vehicle 702 can send sensor data (raw or processed) to the computing device(s) 742 as one or more log files.

The computing device(s) 742 can include processor(s) 744 and a memory 746 storing one or more low impact collision detection and location components 750 and/or a perception component 448. In some instances, the one or more of the one or more low impact collision detection and location components 750 can substantially correspond to one or more of the one or more low impact collision detection and location components 732, one or more components of the low impact collision detection and location system 300, and/or one or more components of the low impact collision detection and location system 420, and can include substantially similar functionality. For example, the one or more low impact collision detection and location components 750 may include a CNN that may be configured with one or more convolution/deconvolution layers. In some instances, the perception component 748 can substantially correspond to the perception component 722 and can include substantially similar functionality.

The processor(s) 716 of the vehicle 702 and the processor(s) 744 of the computing device(s) 742 can be any suitable processor capable of executing instructions to process data and perform operations as described herein. By way of example and not limitation, the processor(s) 716 and 744 can comprise one or more Central Processing Units (CPUs), Graphics Processing Units (GPUs), and/or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 718 and 746 are examples of non-transitory computer-readable media. The memory 718 and 746 can store an operating system and one or more software applications, instructions, programs, and/or data to implement the methods described herein and the functions attributed to the various systems. In various implementations, the memory can be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 7 is illustrated as a distributed system, in alternative examples, components of the vehicle 702 can be associated with the computing device(s) 742 and/or components of the computing device(s) 742 can be associated with the vehicle 702. That is, the vehicle 702 can perform one or more of the functions associated with the computing device(s) 742, and vice versa.

Example Clauses

A: A system comprising: one or more processors; a plurality of audio sensors; and one or more non-transitory computer-readable media storing instructions executable by the one or more processors, wherein the instructions, when executed, cause the system to perform operations comprising: receiving a plurality of streams of audio data from the plurality of audio sensors disposed on an autonomous vehicle in an environment; determining a subset of the plurality of streams associated with a positive collision determination indicating a detection of a collision of the autonomous vehicle with an object in the environment; determining that a quantity of the subset of the plurality of streams associated with the positive collision determination meets a threshold quantity of streams; determining confidence values for individual streams of the subset of the plurality of streams associated with the positive collision determination; determining that the confidence values for the individual streams of the subset of the plurality of streams associated with the positive collision determination meet a threshold confidence value; in response to determining that the quantity of the subset of the plurality of streams meets the threshold quantity of streams and that the confidence values for the individual streams of the subset of the plurality of streams meet the threshold confidence value, determining a collision event associated with the autonomous vehicle; and controlling the autonomous vehicle based at least in part on the collision event.

B: The system of paragraph A, wherein the operations further comprise: determining an audio energy values for the individual streams of the subset of the plurality of streams associated with the positive collision determination; determining a second confidence values for the individual streams of the subset of the plurality of streams associated with the positive collision determination; determining collision location scores for the individual streams of the subset of the plurality of streams associated with the positive collision determination based at least in part on the audio energy values and the second confidence values; and determining a collision location estimate based at least in part on the collision location score, the collision location estimate indicating a location on a body of the autonomous vehicle of the collision of the autonomous vehicle with the object in the environment.

C: The system of paragraph A or B, wherein the operations further comprise determining, in response to determining the collision event based at least in part on the subset of the plurality of streams associated with the positive collision determination, an onset time and an offset time for the collision event based at least in part on the confidence values for the individual streams of the subset of the plurality of streams associated with the positive collision determination.

D: The system of any of paragraphs A-C, wherein controlling the autonomous vehicle based at least in part on the collision event comprises one or more of: transmitting data associated with the collision event to a remote system; requesting manual control of the autonomous vehicle; performing one or more diagnostic operations; and stopping the autonomous vehicle.

E: The system of any of paragraphs A-D, wherein determining the confidence values for the individual streams of the subset of the plurality of streams associated with the positive collision determination comprises determining the confidence values for individual channels of a multichannel data structure that is associated with the plurality of audio sensors.

F: The system of any of paragraphs A-E, wherein determining the confidence values for the individual streams of the subset of the plurality of streams comprises: executing a machine learned model using a convolutional neural network to determine the confidence values for the individual streams of the subset of the plurality of streams, wherein the convolutional neural network is trained at least in part on historical collision data associated with a plurality of collisions.

G: A method comprising: receiving first audio data associated with a first audio sensor configured at an autonomous vehicle in an environment; receiving second audio data associated with a second audio sensor configured at the autonomous vehicle; determining that the first audio data is associated with a first positive collision determination indicating a first detection of a collision of the autonomous vehicle with an object in the environment; determining that the second audio data is associated with a second positive collision determination indicating a second detection of the collision of the autonomous vehicle with the object in the environment; determining, based at least in part on the first positive collision determination and the second positive collision determination, that a collision determination threshold value has been met; in response to determining that the collision determination threshold value has been met, determining a collision event associated with the autonomous vehicle; and controlling the autonomous vehicle based at least in part on the collision event.

H: The method of paragraph G, further comprising determining a collision location estimate associated with the collision event based at least in part on the first audio data and the second audio data.

I: The method of paragraph G or H, wherein determining the collision location estimate comprises: determining an audio energy value for the first audio data; determining a confidence value for the first audio data; determining a collision location score based at least in part on the audio energy value and the confidence value; and determining the collision location estimate based at least in part on the collision location score.

J: The method of any of paragraphs G-I, further comprising: determining a first confidence value for the first audio data and a second confidence value for the second audio data; and determining, based at least in part on the first confidence value and the second confidence value, that a threshold confidence value has been met, wherein determining the collision event associated with the autonomous vehicle is further based at least in part on determining that the threshold confidence value has been met.

K: The method of paragraph J, wherein the first confidence value is associated with one or more of: the first positive collision determination; the first audio sensor; and the first audio data.

L: The method of any of paragraphs G-K, further comprising, in response to determining the collision event, determining an onset time and an offset time for the collision event.

M: The method of any of paragraphs G-L, wherein determining that the first audio data is associated with the first positive collision determination comprises: executing a machine learned model using a convolutional neural network to determine a classification for the first audio data; and determining that the first audio data is associated with the first positive collision determination based at least in part on the classification.

N: The method of paragraph M, wherein the machine learned model is trained to determine the classification for the first audio data based at least in part on historical collision data associated with a plurality of collisions.

O: One or more non-transitory computer-readable media storing instructions that, when executed by one or more processors, perform operations comprising: receiving a first stream of audio data associated with a first audio sensor configured at an autonomous vehicle in an environment; receiving a second stream of audio data associated with a second audio sensor configured at the autonomous vehicle; determining that the first stream of audio data is associated with a first positive collision determination indicating a first detection of a collision of the autonomous vehicle with an object in the environment; determining that the second stream of audio data is associated with a second positive collision determination indicating a second detection of the collision of the autonomous vehicle with the object in the environment; determining, based at least in part on the first positive collision determination and the second positive collision determination, that a collision determination threshold value has been met; in response to determining that the collision determination threshold value has been met, determining a collision event associated with the autonomous vehicle; and controlling the autonomous vehicle based at least in part on the collision event.

P: The one or more non-transitory computer-readable media of paragraph O, wherein the determining that the first stream of audio data is associated with the first positive collision determination comprises determining that a frame of audio data associated with the first stream of audio data is associated with the first positive collision determination.

Q: The one or more non-transitory computer-readable media of paragraph O or P, wherein determining that the first stream of audio data is associated with the first positive collision determination comprises: extracting a feature set for the first stream of audio data; and determining that the first stream of audio data is associated with the first positive collision determination based at least in part on the feature set.

R: The one or more non-transitory computer-readable media of paragraph Q, wherein the operations further comprise determining a confidence value for the first stream of audio data based at least in part on the feature set; and determining that the first stream of audio data is associated with the first positive collision determination based at least in part on the confidence value.

S: The one or more non-transitory computer-readable media of paragraph Q, wherein the operations further comprise: determining an audio energy value for the first stream of audio data based at least in part on the feature set; determining a confidence value for the first stream of audio data based at least in part on the feature set; determining a collision location score based at least in part on the audio energy value and the confidence value; and determining a collision location estimate based at least in part on the collision location score.

T: The one or more non-transitory computer-readable media of any of paragraphs O-S, wherein determining that the first stream of audio data is associated with the first positive collision determination comprises: executing a machine learned model using a convolutional neural network to determine a classification associated with the first stream of audio data; and determining that the first stream of audio data is associated with the first positive collision determination based at least in part on the classification, wherein the convolutional neural network is trained at least in part on historical collision data associated with a plurality of collisions.

While the example clauses described above are described with respect to one particular implementation, it should be understood that, in the context of this document, the content of the example clauses can also be implemented via a method, device, system, computer-readable medium, and/or another implementation. Additionally, any of examples A-T can be implemented alone or in combination with any other one or more of the examples A-T.

CONCLUSION

While one or more examples of the techniques described herein have been described, various alterations, additions, permutations, and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
one or more processors;
a plurality of audio sensors; and
one or more non-transitory computer-readable media storing instructions executable by the one or more processors, wherein the instructions, when executed, cause the system to perform operations comprising:
receiving a plurality of streams of audio data from the plurality of audio sensors disposed on an autonomous vehicle in an environment;
determining a subset of the plurality of streams of audio data associated with a positive collision determination indicating a detection of a collision of the autonomous vehicle with an object in the environment;
determining that a quantity of the subset of the plurality of streams of audio data associated with the positive collision determination meets a threshold quantity of streams;
determining first confidence values for individual streams of the subset of the plurality of streams of audio data associated with the positive collision determination;
determining that the first confidence values for the individual streams of the subset of the plurality of streams of audio data associated with the positive collision determination meet a threshold confidence value;
in response to determining that the quantity of the subset of the plurality of streams of audio data meets the threshold quantity of streams and that the first confidence values for the individual streams of the subset of the plurality of streams of audio data meet the threshold confidence value, determining a collision event associated with the autonomous vehicle;
determining audio energy values for the individual streams of the subset of the plurality of streams of audio data associated with the positive collision determination;
determining collision location scores for the individual streams of the subset of the plurality of streams of audio data associated with the positive collision determination based at least in part on the audio energy values; and
determining a collision location estimate based at least in part on the collision location scores, the collision location estimate indicating a location on a body of the autonomous vehicle of the collision of the autonomous vehicle with the object in the environment; and
controlling the autonomous vehicle based at least in part on one or more of the collision event or the collision location estimate.

2. The system of claim 1, wherein the operations further comprise:
determining second confidence values for the individual streams of the subset of the plurality of streams of audio data associated with the positive collision determination; and
determining the collision location scores for the individual streams of the subset of the plurality of streams of audio data associated with the positive collision determination further based at least in part on the second confidence values.

3. The system of claim 1, wherein the operations further comprise determining, in response to determining the collision event based at least in part on the subset of the plurality of streams of audio data associated with the positive collision determination, an onset time and an offset time for the collision event based at least in part on the first confidence values for the individual streams of the subset of the plurality of streams of audio data associated with the positive collision determination.

4. The system of claim 1, wherein controlling the autonomous vehicle based at least in part on one or more of the collision event or the collision location estimate comprises one or more of:
transmitting data associated with the collision event to a remote system;
transmitting data associated with the collision location estimate to the remote system;
requesting manual control of the autonomous vehicle;
performing one or more diagnostic operations; and
stopping the autonomous vehicle.

5. The system of claim 1, wherein determining the first confidence values for the individual streams of the subset of the plurality of streams of audio data associated with the positive collision determination comprises determining the first confidence values for individual channels of a multi-channel data structure that is associated with the plurality of audio sensors.

6. The system of claim 1, wherein determining the first confidence values for the individual streams of the subset of the plurality of streams of audio data comprises:
executing a machine learned model using a convolutional neural network to determine the first confidence values for the individual streams of the subset of the plurality of streams of audio data,
wherein the convolutional neural network is trained at least in part on historical collision data associated with a plurality of collisions.

7. A method comprising:
receiving first audio data associated with a first audio sensor configured at an autonomous vehicle in an environment;
receiving second audio data associated with a second audio sensor configured at the autonomous vehicle;
determining that the first audio data is associated with a first positive collision determination indicating a first detection of a collision of the autonomous vehicle with an object in the environment;
determining that the second audio data is associated with a second positive collision determination indicating a second detection of the collision of the autonomous vehicle with the object in the environment;
determining that a quantity of the first audio data associated with the first positive collision determination and the second audio data associated with the second positive collision determination meets or exceeds a data quantity threshold value;
in response to determining that the quantity meets or exceeds the data quantity threshold value, determining a collision event associated with the autonomous vehicle;
determining a collision location estimate associated with the collision event by:
determining a first audio energy value for the first audio data;
determining a first collision location score based at least in part on the first audio energy value; and
determining the collision location estimate based at least in part on the first collision location score; and
controlling the autonomous vehicle based at least in part on one or more of the collision event or the collision location estimate.

8. The method of claim 7, further comprising determining the collision location estimate further based at least in part on a second collision location score based at least on part on a second audio energy value for the second audio data.

9. The method of claim 7, wherein determining the collision location estimate comprises:
determining a confidence value for the first audio data; and
determining the first collision location score further based at least in part on the confidence value.

10. The method of claim 7, further comprising:
determining a first confidence value for the first audio data and a second confidence value for the second audio data; and
determining, based at least in part on the first confidence value and the second confidence value, that a threshold confidence value has been met, wherein determining the collision event associated with the autonomous vehicle is further based at least in part on determining that the threshold confidence value has been met.

11. The method of claim 10, wherein the first confidence value is associated with one or more of:
the first positive collision determination;
the first audio sensor; and
the first audio data.

12. The method of claim 7, further comprising, in response to determining the collision event, determining an onset time and an offset time for the collision event.

13. The method of claim 7, wherein determining that the first audio data is associated with the first positive collision determination comprises:
executing a machine learned model using a convolutional neural network to determine a classification for the first audio data; and
determining that the first audio data is associated with the first positive collision determination based at least in part on the classification.

14. The method of claim 13, wherein the machine learned model is trained to determine the classification for the first audio data based at least in part on historical collision data associated with a plurality of collisions.

15. One or more non-transitory computer-readable media storing instructions that, when executed by one or more processors, perform operations comprising:

receiving a first stream of audio data associated with a first audio sensor configured at an autonomous vehicle in an environment;
receiving a second stream of audio data associated with a second audio sensor configured at the autonomous vehicle;
determining that the first stream of audio data is associated with a first positive collision determination indicating a first detection of a collision of the autonomous vehicle with an object in the environment;
determining that the second stream of audio data is associated with a second positive collision determination indicating a second detection of the collision of the autonomous vehicle with the object in the environment;
determining that a quantity of first data of the first stream of audio data associated with the first positive collision determination and second data of the second stream of audio data associated with the second positive collision determination meets or exceeds a data quantity threshold value;
in response to determining that the quantity meets or exceeds the data quantity threshold value, determining a collision event associated with the autonomous vehicle;
determining a collision location estimate associated with the collision event by:
determining an audio energy value for the first stream of audio data;
determining a collision location score based at least in part on the audio energy value; and
determining the collision location estimate based at least in part on the collision location score; and
controlling the autonomous vehicle based at least in part on one or more of the collision event or the collision location estimate.

16. The one or more non-transitory computer-readable media of claim 15, wherein determining that the first stream of audio data is associated with the first positive collision determination comprises determining that a frame of audio data associated with the first stream of audio data is associated with the first positive collision determination.

17. The one or more non-transitory computer-readable media of claim 15, wherein determining that the first stream of audio data is associated with the first positive collision determination comprises:
extracting a feature set for the first stream of audio data; and
determining that the first stream of audio data is associated with the first positive collision determination based at least in part on the feature set.

18. The one or more non-transitory computer-readable media of claim 17, wherein the operations further comprise:
determining a confidence value for the first stream of audio data based at least in part on the feature set; and
determining that the first stream of audio data is associated with the first positive collision determination based at least in part on the confidence value.

19. The one or more non-transitory computer-readable media of claim 15, wherein determining the collision location estimate comprises:
determining a confidence value for the first stream of audio data; and
determining the collision location score further based at least in part on the confidence value.

20. The one or more non-transitory computer-readable media of claim 15, wherein determining that the first stream of audio data is associated with the first positive collision determination comprises:
    executing a machine learned model using a convolutional neural network to determine a classification associated with the first stream of audio data; and
    determining that the first stream of audio data is associated with the first positive collision determination based at least in part on the classification,
        wherein the convolutional neural network is trained at least in part on historical collision data associated with a plurality of collisions.

\* \* \* \* \*